US009629094B2

(12) United States Patent
Damnjanovic et al.

(10) Patent No.: US 9,629,094 B2
(45) Date of Patent: Apr. 18, 2017

(54) TECHNIQUES FOR PRIORITIZING TRANSMISSIONS IN MULTIPLE CONNECTIVITY WIRELESS COMMUNICATIONS

(71) Applicant: QUALCOMM Incorporated, San Diego, CA (US)

(72) Inventors: Jelena Damnjanovic, Del Mar, CA (US); Peter Gaal, San Diego, CA (US); Wanshi Chen, San Diego, CA (US); Aleksandar Damnjanovic, Del Mar, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/735,819

(22) Filed: Jun. 10, 2015

(65) Prior Publication Data

US 2016/0044599 A1    Feb. 11, 2016

Related U.S. Application Data

(60) Provisional application No. 62/033,550, filed on Aug. 5, 2014.

(51) Int. Cl.
*H04B 7/00* (2006.01)
*H04W 52/04* (2009.01)
(Continued)

(52) U.S. Cl.
CPC ......... *H04W 52/04* (2013.01); *H04W 52/146* (2013.01); *H04W 52/248* (2013.01);
(Continued)

(58) Field of Classification Search
None
See application file for complete search history.

(56) References Cited

U.S. PATENT DOCUMENTS

2004/0002341 A1    1/2004  Chen
2008/0108369 A1*   5/2008  Visotsky .............. H04B 7/2606
                                                          455/455

(Continued)

FOREIGN PATENT DOCUMENTS

WO    WO-2014/180351 A1    11/2014

OTHER PUBLICATIONS

International Search Report and Written Opinion—PCT/US2015/035280—ISA/EPO—Jan. 26, 2016 (11 total pages).

*Primary Examiner* — Mohammed Rachedine
(74) *Attorney, Agent, or Firm* — Arent Fox LLP

(57) ABSTRACT

Certain aspects of the present disclosure relate to allocating transmission power in multiple connectivity wireless networks. A device can establish a first connection with a first primary cell in a first cell group as well as a second connection with a second primary cell in a second cell group. The device can determine whether to prioritize a first communication over the first connection or a second communication over the second connection, wherein the first communication and the second communication are scheduled for concurrent transmission. In addition, the device can transmit at least one of the first communication over the first connection or the second communication over the second connection in a transmission time interval based at least in part on determining whether to prioritize the first communication or the second communication.

29 Claims, 13 Drawing Sheets

(51) Int. Cl.
| | |
|---|---|
| *H04W 76/02* | (2009.01) |
| *H04W 74/08* | (2009.01) |
| *H04W 76/04* | (2009.01) |
| *H04W 52/14* | (2009.01) |
| *H04W 52/24* | (2009.01) |
| *H04W 52/28* | (2009.01) |
| *H04W 52/32* | (2009.01) |
| *H04W 52/48* | (2009.01) |
| *H04W 52/50* | (2009.01) |
| *H04W 88/06* | (2009.01) |
| *H04B 7/022* | (2017.01) |

(52) U.S. Cl.
CPC ....... *H04W 52/281* (2013.01); *H04W 52/325* (2013.01); *H04W 52/48* (2013.01); *H04W 52/50* (2013.01); *H04W 74/0833* (2013.01); *H04W 76/025* (2013.01); *H04W 76/046* (2013.01); *H04B 7/022* (2013.01); *H04W 88/06* (2013.01)

(56) References Cited

U.S. PATENT DOCUMENTS

| | | | |
|---|---|---|---|
| 2010/0172299 A1* | 7/2010 | Fischer | H04W 74/0866 370/328 |
| 2013/0058315 A1 | 3/2013 | Feuersaenger et al. | |
| 2013/0130738 A1* | 5/2013 | Cherian | H04W 52/228 455/522 |
| 2014/0056278 A1* | 2/2014 | Marinier | H04W 72/044 370/330 |
| 2014/0071905 A1 | 3/2014 | Nimmala et al. | |
| 2014/0211647 A1* | 7/2014 | Li | H04W 24/10 370/252 |
| 2016/0044701 A1* | 2/2016 | Zhang | H04W 28/0278 370/329 |

* cited by examiner

US 9,629,094 B2

TECHNIQUES FOR PRIORITIZING TRANSMISSIONS IN MULTIPLE CONNECTIVITY WIRELESS COMMUNICATIONS

CLAIM OF PRIORITY UNDER 35 U.S.C. §119

The present application for patent claims priority to Provisional Application No. 62/033,550 entitled "TECHNIQUES FOR PRIORITIZING TRANSMISSIONS IN MULTIPLE CONNECTIVITY WIRELESS COMMUNICATIONS" filed Aug. 5, 2014, which is assigned to the assignee hereof and hereby expressly incorporated in its entirety by reference herein.

FIELD OF THE DISCLOSURE

The present disclosure, for example, relates to wireless communication systems, and more particularly to techniques for prioritizing transmissions in wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In multiple connectivity, the UE can be configured to communicate with multiple cells or cell groups configured by multiple base stations using multiple links. The UE, however, may be power limited and may not be able to transmit communications to the multiple cells or cell groups at transmission powers expected by the cells or cell groups. Moreover, for example, UE capability for transmitting a maximum number of transport block bits within a transmission time interval (TTI) may be exceeded.

SUMMARY OF THE DISCLOSURE

Aspects of the present disclosure relate generally to wireless communications, and more particularly, to techniques for prioritizing transmissions in multiple connectivity wireless communications.

In accordance with an aspect, a wireless device (e.g., user equipment (UE)) may communicate with multiple cells or cell groups (e.g., a primary cell group (PCG) or secondary cell group (SCG)), where a cell group can be configured by one or more base stations (e.g., a master eNodeB (MeNodeB or MeNB) and/or at least one a secondary eNodeB (SeNodeB or SeNB)) in a wireless network. Each of the PCG and SCG can include one or more cells. In an example, the wireless device may configure a first connection (e.g., over one or more carriers) with a PCG, and the wireless device may configure a second connection (e.g., over one or more carriers) with a SCG. The wireless device may accordingly determine whether to prioritize communications with the PCG and SCG (e.g., determine whether to prioritize transmissions, related channels, transmission power, etc.) when in the communications are scheduled in similar time periods (e.g., the communications to the PCG and SCG are concurrent). For example, the wireless device may determine whether to prioritize random access channel transmissions for the PCG or SCG, a transmission power for communicating with the PCG and/or SCG, transport block bits for communicating with the PCG and/or SCG, etc.

In an example, a method for allocating transmission power in multiple connectivity wireless networks is provided. The method includes establishing a first connection with a first primary cell in a first cell group, establishing a second connection with a second primary cell in a second cell group, determining whether to prioritize a first communication over the first connection or a second communication over the second connection, wherein the first communication and the second communication are scheduled for concurrent transmission, and transmitting at least one of the first communication over the first connection or the second communication over the second connection in a transmission time interval (TTI) based at least in part on determining whether to prioritize the first communication or the second communication.

The method may also include wherein the first communication relates to a first random access procedure performed over the first connection with the first primary cell, and wherein the second communication relates to a second random access procedure performed over the second connection with the second primary cell. The method may further include wherein determining whether to prioritize the first communication or the second communication comprises prioritizing the second random access procedure over the first random access procedure based at least in part on a number of random access attempts in the first random access procedure. The method may additionally include wherein determining whether to prioritize the first communication or the second communication comprises prioritizing the second random access procedure over the first random access procedure based at least in part on a power to use for a next random access transmission in the second random access procedure. Further, the method may include wherein the first random access procedure is based on a first timer, and the second random access procedure is based on a second timer, wherein the first timer and the second timer utilize different timer values. Also, the method may include wherein transmitting at least one of the first communication or the second communication comprises at least one of transmitting a second access probe of the second random access procedure in the TTI instead of a first access probe of the first random access procedure or transmitting the second access probe with a higher transmission power than the first access probe in the TTI.

The method may additionally include configuring a first transmission power for communicating with the first cell group in the TTI based at least in part on receiving the first transmission power from the first primary cell, and configuring a second transmission power for communicating with the second cell group in the TTI based at least in part on receiving the second transmission power from the first primary cell or the second primary cell, wherein determining whether to prioritize the first communication or the second communication comprises determining to prioritize the first communication or the second communication based on the first transmission power and the second transmission power, and wherein transmitting the at least one of the first communication or the second communication comprises transmitting the first communication over the first connection based on the first transmission power and transmitting the second communication over the second connection based on the second transmission power in the TTI. The method may also include wherein receiving the second transmission power comprises receiving the second transmission power from the second primary cell in a message tunneled through the first primary cell. Moreover, the method may include using a different transmission power for communicating with the second cell group in the TTI until the second transmission power is received, wherein the different transmission power is a previous transmission power used for communicating with the second cell group. The method may also include using a different transmission power for communicating with the second cell group in the TTI until the second transmission power is received, wherein the different transmission power is set based at least in part on the first transmission power where the first transmission power plus a current transmission power used in communicating with the second cell group exceeds an available transmission power. Further, the method may include wherein at least one of the first transmission power or the second transmission power are received as a value that maps to one of a plurality of percentages of available transmission power. The method may also include wherein at least a portion of the plurality of percentages are of different granularity.

The method may also include wherein determining whether to prioritize the first communication or the second communication comprises determining to prioritize a number of transport block bits for transmission over the first connection or the second connection based at least in part on a content of a channel to which the transport block bits relate. Additionally, the method may include wherein determining to prioritize the number of transport block bits comprises prioritizing transport block bits related to retransmissions over those related to new transmissions. Further, the method may include wherein determining to prioritize the number of transport block bits comprises scaling a transmission power of transport block bits on an uplink control channel that correspond to radio resource control (RRC) communications.

In another example, an apparatus for allocating transmission power in multiple connectivity wireless networks is provided. The apparatus includes a communicating component configured to establish a first connection with a first primary cell in a first cell group, and establish a second connection with a second primary cell in a second cell group, and a transmission prioritizing component configured to determine whether to prioritize a first communication over the first connection or a second communication over the second connection, wherein the first communication and the second communication are scheduled for concurrent transmission, wherein the communicating component is further configured to transmit at least one of the first communication over the first connection or the second communication over the second connection in a transmission time interval (TTI) based at least in part on the transmission prioritizing component determining whether to prioritize the first communication or the second communication.

The apparatus can further include wherein the first communication relates to a first random access procedure performed over the first connection with the first primary cell, and wherein the second communication relates to a second random access procedure performed over the second connection with the second primary cell. The apparatus may also include wherein the transmission prioritizing component comprises a random access channel (RACH) component configured to prioritize the second random access procedure over the first random access procedure based at least in part on a number of random access attempts in the first random access procedure. Additionally, the apparatus may include wherein the transmission prioritizing component comprises a random access channel (RACH) component configured to prioritize the second random access procedure over the first random access procedure based at least in part on a power to use for a next random access transmission in the second random access procedure. Further, the apparatus may include wherein the communicating component is configured to at least one of transmit a second access probe of the second random access procedure in the TTI instead of a first access probe of the first random access procedure or transmit the second access probe with a higher transmission power than the first access probe in the TTI.

The transmission prioritizing component of the apparatus may include a transmission power allocating component configured to configure a first transmission power for communicating with the first cell group in the TTI based at least in part on receiving the first transmission power from the first primary cell, and configure a second transmission power for communicating with the second cell group in the TTI based at least in part on receiving the second transmission power from the first primary cell or the second primary cell, wherein the transmission prioritizing component is configured to determining to prioritize the first communication or the second communication based on the first transmission power and the second transmission power, and wherein the communicating component is configured to transmit the first communication over the first connection based on the first transmission power and transmit the second communication over the second connection based on the second transmission power in the TTI. The apparatus may also include wherein the transmission power allocating component is configured to receive the second transmission power from the second primary cell in a message tunneled through the first primary cell. The apparatus may additionally include wherein the transmission power allocating component is configured to use a different transmission power for communicating with the second cell group in the TTI until the second transmission power is received, wherein the different transmission power is a previous transmission power used for communicating with the second cell group. Moreover, the apparatus may include wherein the transmission power allocating component is configured to use a different transmission power for communicating with the second cell group in the TTI until the second transmission power is received, wherein the different transmission power is set based at least in part on the first transmission power where the first transmission power plus a current transmission power used in communicating with the second cell group exceeds an available transmission power. The apparatus may also include wherein the transmission power allocating component is configured to receive at least one of the first transmission power or the second transmission power as a value that maps to one of a plurality of percentages of available transmission power.

The apparatus may further include wherein the transmission prioritizing component is configured to determine to prioritize a number of transport block bits for transmission over the first connection or the second connection based at least in part on a content of a channel to which the transport block bits relate.

In yet another example, an apparatus for allocating transmission power in multiple connectivity wireless networks is provided. The apparatus includes means for establishing a first connection with a first primary cell in a first cell group, and establishing a second connection with a second primary cell in a second cell group, means for determining whether to prioritize a first communication over the first connection or a second communication over the second connection, wherein the first communication and the second communication are scheduled for concurrent transmission, and means for transmitting at least one of the first communication over the first connection or the second communication over the second connection in a transmission time interval (TTI) based at least in part on the means for determining whether to prioritize the first communication or the second communication. The apparatus may also include wherein the first communication relates to a first random access procedure performed over the first connection with the first primary cell, and wherein the second communication relates to a second random access procedure performed over the second connection with the second primary cell.

In another example, a computer-readable storage medium comprising computer-executable code for allocating transmission power in multiple connectivity wireless networks is provided. The code includes code for establishing a first connection with a first primary cell in a first cell group, and establishing a second connection with a second primary cell in a second cell group, code for determining whether to prioritize a first communication over the first connection or a second communication over the second connection, wherein the first communication and the second communication are scheduled for concurrent transmission, and code for transmitting at least one of the first communication over the first connection or the second communication over the second connection in a transmission time interval (TTI) based at least in part on the code for determining whether to prioritize the first communication or the second communication. The computer-readable storage medium can also include wherein the first communication relates to a first random access procedure performed over the first connection with the first primary cell, and wherein the second communication relates to a second random access procedure performed over the second connection with the second primary cell Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
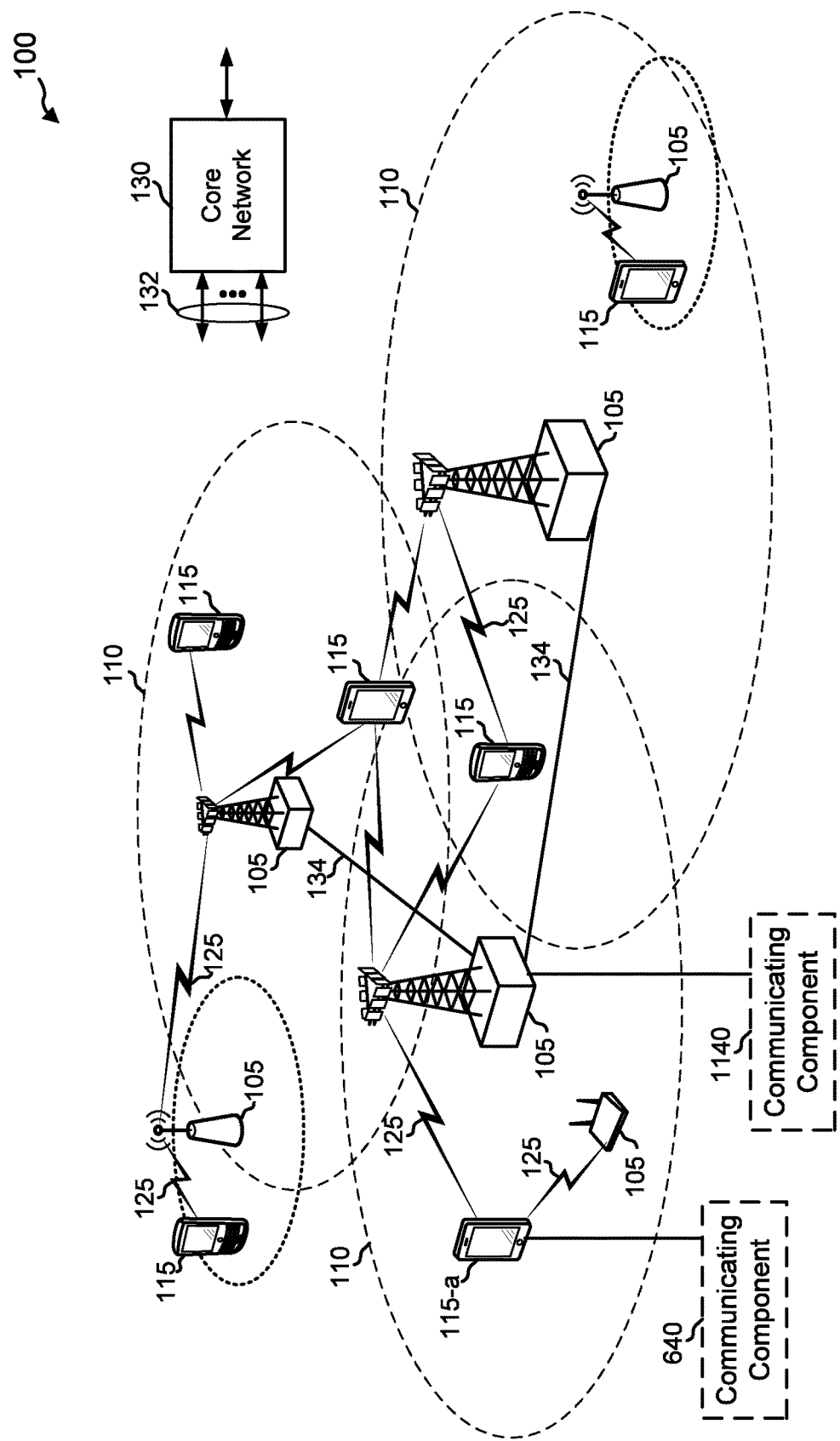
FIG. 1 is a block diagram conceptually illustrating an example of a wireless communications system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques including methods, apparatuses, devices, and systems are described for determining whether to prioritize transmissions to multiple cells or cell groups in a multiple connectivity wireless communications. In some aspects, a wireless device (e.g., user equipment (UE)) can communicate with the multiple cells configured by one or more network entities using multiple connectivity wireless communications, which may include receiving granted resources from each of the multiple cells, over which the wireless device can communicate in accessing a wireless network. In some aspects, a wireless device may receive first configuration information to communicate with a first primary cell (e.g., a primary cell (PCell) of a master cell group (MCG)/primary cell group (PCG), also referred to herein as $PCell_{PCG}$). The wireless device may also receive second configuration information to communicate with a second primary cell (e.g., a second PCell of a secondary cell group (SCG), also referred to herein as $PCell_{SCG}$). In the case of multiple connectivity, the PCells may be configured by different eNodeBs (e.g., a master eNodeB or MeNodeB that provides the $PCell_{PCG}$, and a secondary eNodeB or SeNodeB that provides the $PCell_{SCG}$).

The wireless device may determine whether to prioritize transmissions to the PCG and SCG based on one or more parameters. In one example, the wireless device may determining to prioritize concurrent transmissions to the PCG or SCG due to being power limited, and thus unable to transmit to the PCG and SCG using full power. In any case, determining to prioritize transmissions can include determining a transmission power to allocate to random access channel (RACH) transmissions to the PCG and SCG when the transmissions are scheduled in a similar time period. In another example, determining to prioritize transmissions can include determining percentages of transmission power to allocate to the PCG and SCG for transmissions in similar time periods. In another example, determining to prioritize transmissions can include determining to transmit and/or drop transport block (TB) bits for TBs to be transmitted in a similar time period for the PCG and SCG based on content of the channel being transmitted.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with various aspects of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. One or more UEs 115 can include a communicating component 640 for determining whether to prioritize communications with multiple base stations 105 or related cells configured in multiple connectivity wireless communications. One or more base stations 105 can include a communicating component 1140 for providing transmit power percentages or other parameters to the one or more UEs 115 for concurrently communicating with the one or more base stations 105 or related cells. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) or multiple connectivity wireless communications with two or more cells provided by one or more eNodeBs 105. The eNodeBs 105 that are used for CA/multiple connectivity wireless communications may be collocated or may be connected through fast connections and/or non-collocated. In either case, coordinating the aggregation of component carriers (CCs) for wireless communications between the UE 115 and the eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects. For example, in carrier aggregation for dual connectivity (e.g., UE 115 connected to two non-collocated eNodeBs 105), the UE 115 may receive configuration information to communicate with a first eNodeB 105 (e.g., SeNodeB or SeNB) through a primary cell of the first eNodeB 105. The first eNodeB 105 may include a group of cells referred to as a secondary cell group or SCG, which includes one or more secondary cells and the primary cell or $PCell_{SCG}$ of the first eNodeB 105. The UE 115 may also receive configuration information to communicate with a second eNodeB 105 (e.g., MeNodeB or MeNB) through a second primary cell of the second eNodeB 105. The second eNodeB 105 may include a group of cells referred to as a primary cell group or PCG, which includes one or more secondary cells and the primary cell or PCell of the second eNodeB 105.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). The master eNodeB 105 may transmit, to the same UE 115, configuration information via its PCell for that UE 115 to communicate with the other eNodeB 105. The two eNodeBs 105 may be non-collocated.

In examples described herein, UE 115 can be configured for determining whether to prioritize transmissions to a PCG and SCG in similar time periods. For example, UE 115 may be power limited, and may schedule transmissions to the PCG and SCG in a similar time period such that the UE 115 can allocate transmission resources (e.g., transmission power) to the transmissions to the PCG and/or SCG based on one or more parameters regarding the transmissions, prior transmissions, parameters configured by the PCG and/or SCG, etc. For example, this may include transmitting RACH signals in a RACH procedure with the PCG based at least in part on an ongoing RACH procedure with the SCG and/or vice versa. In another example, prioritizing transmissions may include allocating a percentage of transmission power to transmissions with the PCG and a remaining or another percentage of transmission power to transmissions with the SCG. This can be based on percentages configured by the PCG and/or SCG, in one example. In a further example, prioritizing transmissions may include determining whether to transmit or block TB bits over one or more channels with the PCG or SCG based at least in part on channel content. For example, TB bits related to control and radio resource control (RRC) communications may be transmitted over other communications (e.g., which may be dropped).

Figure 2:
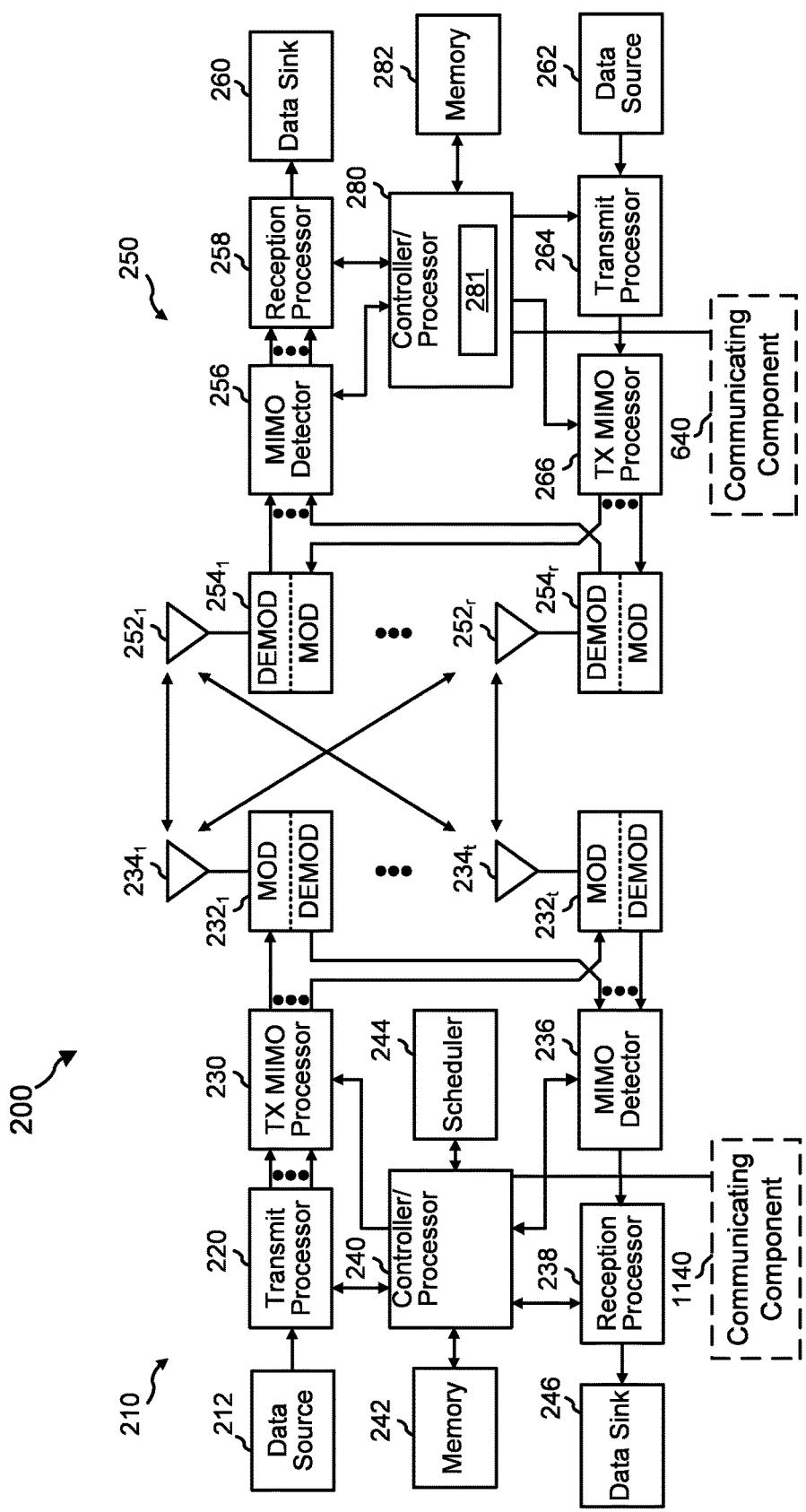
FIG. 2 is a block diagram conceptually illustrating examples of an eNodeB and a UE configured in accordance with various aspects of the present disclosure.

FIG. 2 is a block diagram conceptually illustrating examples of an eNodeB 210 and a UE 250 configured in accordance with an aspect of the present disclosure. For example, the eNodeB 210 and the UE 250 of a system 200, as shown in FIG. 2, may be one of the eNodeBs and one of the UEs in FIG. 1, respectively. Thus, for example, UE 250 can include a communicating component 640 for determining whether to prioritize communications with multiple eNodeBs 210 or related cells configured in multiple connectivity wireless communications. The eNodeB 210 can include a communicating component 1140 for providing transmit power percentages or other parameters to one or more UEs 250 for concurrently communicating with eNodeB 210 and another eNodeB or related cell. In some aspects, the eNodeB 210 may support multiple connectivity (e.g., dual connectivity), carrier aggregation, etc. The eNodeB 210 may be an MeNodeB or MeNB having one of the cells in its PCG configured as a $PCell_{PCG}$ or an SeNodeB or SeNB having one of its cells in its SCG configured as a $PCell_{SCG}$. In some aspects, the UE 250 may also support multiple connectivity carrier aggregation. The UE 250 may receive configuration information from the eNodeB 210 via the PCell$_{PCG}$ and/or the PCell$_{SCG}$. The eNodeB 210 may be equipped with antennas 234$_{1-t}$, and the UE 250 may be equipped with antennas 252$_{1-r}$, wherein t and r are integers greater than or equal to one.

At the eNodeB 210, a eNodeB transmit processor 220 may receive data from a eNodeB data source 212 and control information from a eNodeB controller/processor 240. The control information may be carried on the PBCH, PCFICH, physical hybrid automatic repeat/request (HARQ) indicator channel (PHICH), PDCCH, etc. The data may be carried on the PDSCH, etc. The eNodeB transmit processor 220 may process (e.g., encode and symbol map) the data and control information to obtain data symbols and control symbols, respectively. The eNodeB transmit processor 220 may also generate reference symbols, e.g., for the PSS, SSS, and cell-specific reference signal (RS). A eNodeB transmit (TX) multiple-input multiple-output (MIMO) processor 230 may perform spatial processing (e.g., precoding) on the data symbols, the control symbols, and/or the reference symbols, if applicable, and may provide output symbol streams to the eNodeB modulators/demodulators (MODs/DEMODs) 232$_{1-t}$. Each eNodeB modulator/demodulator 232 may process a respective output symbol stream (e.g., for OFDM, etc.) to obtain an output sample stream. Each eNodeB modulator/demodulator 232 may further process (e.g., convert to analog, amplify, filter, and upconvert) the output sample stream to obtain a downlink signal. Downlink signals from modulators/demodulators 232$_{1-t}$ may be transmitted via the antennas 234$_{1-t}$, respectively.

At the UE 250, the UE antennas 252$_1$, may receive the downlink signals from the eNodeB 210 and may provide received signals to the UE modulators/demodulators (MODs/DEMODs) 254$_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators 254$_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the PUSCH) from a UE data source 262 and control information (e.g., for the PUCCH) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators 254$_{1-r}$ (e.g., for SC-FDM, etc.), and transmitted to the eNodeB 210. At the eNodeB 210, the uplink signals from the UE 250 may be received by the eNodeB antennas 234, processed by the eNodeB modulators/demodulators 232, detected by a eNodeB MIMO detector 236 if applicable, and further processed by a eNodeB reception processor 238 to obtain decoded data and control information sent by the UE 250. The eNodeB reception processor 238 may provide the decoded data to a eNodeB data sink 246 and the decoded control information to the eNodeB controller/processor 240.

The eNodeB controller/processor 240 and the UE controller/processor 280 may direct the operation at the eNodeB 210 and the UE 250, respectively. The UE controller/processor 280 and/or other processors and modules at the UE 250 may also perform or direct, e.g., the execution of the functional blocks illustrated in FIG. 6 and/or FIG. 11, and/or other processes for the techniques described herein (e.g., flowcharts illustrated in FIGS. 7, 8, 9, 10, 12, etc.). In some aspects, at least a portion of the execution of these functional blocks and/or processes may be performed by block 281 in the UE controller/processor 280. The eNodeB memory 242 and the UE memory 282 may store data and program codes for the eNodeB 210 and the UE 250, respectively. For example, the UE memory 282 may store configuration information for multiple connectivity provided by the eNodeB 210 and/or another eNodeB. A scheduler 244 may be used to schedule UE 250 for data transmission on the downlink and/or uplink.

In one configuration, the UE 250 may include means for establishing a first connection with a first primary cell in a first cell group, and establishing a second connection with a second primary cell in a second cell group, means for determining whether to prioritize a first communication over the first connection or a second communication over the second connection, wherein the first communication and the second communication are scheduled for concurrent transmission, and/or means for transmitting at least one of the first communication over the first connection or the second communication over the second connection in a transmission time interval (TTI) based at least in part on the means for determining whether to prioritize the first communication or the second communication. In one aspect, the aforementioned means may be or may include the UE controller/processor 280, the UE memory 282, the UE reception processor 258, the UE MIMO detector 256, the UE modulators/demodulators 254, and/or the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6 and/or FIG. 11.

In another configuration, the eNodeB 210 may include means for determining a first transmission power allocation for a first connection with a user equipment (UE), means for determining a second transmission power allocation for a second connection between the UE and secondary cell, and means for transmitting the first transmission power allocation and the second transmission power allocation to the UE. In one aspect, the aforementioned means may be or may include the eNodeB controller/processor 240, the eNodeB memory 242, the eNodeB reception processor 238, the eNodeB MIMO detector 236, the eNodeB modulators/demodulators 232, and/or the eNodeB antennas 234 configured to perform the functions recited by the aforementioned means. In another aspect, the aforementioned means may be a module, component, or any apparatus configured to perform the functions recited by the aforementioned means. Examples of such modules, components, or apparatus may be described with respect to FIG. 6 and/or FIG. 11.

Figure 3:
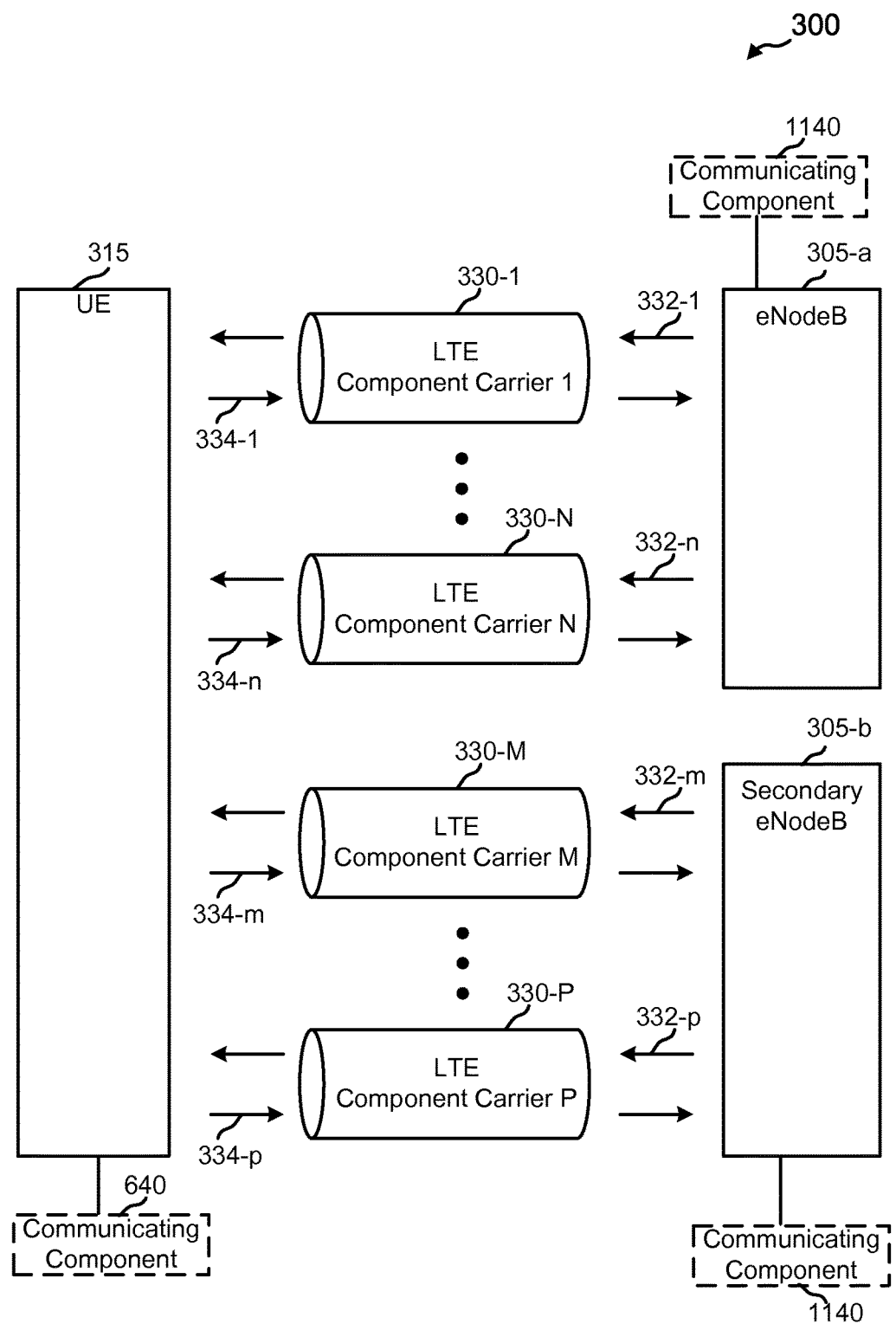
FIG. 3 is a block diagram conceptually illustrating an aggregation of radio access technologies at a UE, in accordance with various aspects of the present disclosure.

FIG. 3 is a block diagram conceptually illustrating an aggregation of carriers and/or connections at a UE, in accordance with an aspect of the present disclosure. The aggregation may occur in a system 300 including a multi-mode UE 315, which can communicate with an eNodeB 305-a using one or more component carriers 1 through N (CC$_1$-CC$_N$), and/or with a secondary eNodeB 305-b using one or more component carriers M through P ($CC_M$-$CC_P$). For example, the eNodeB 305-a and/or secondary eNodeB 305-b may include an AP, femto cell, pico cell, etc. UE 315 can include a communicating component 640 for determining whether to prioritize communications with multiple eNodeBs 305-a/305-b or related cells configured in multiple connectivity wireless communications. The eNodeB 305-a (and/or eNodeB 305-b) can include a communicating component 1140 for providing transmit power percentages or other parameters to one or more UEs 315 for concurrently communicating with eNodeB 305-a (and/or 305-b) and another eNodeB 305-b (and/or 305-a) or related cells. UE 315 may be a multi-mode UE in this example that supports more than one radio access technology (RAT). For example, the UE 315 may support at least a WWAN radio access technology (e.g., LTE) and/or a WLAN radio access technology (e.g., Wi-Fi). A multi-mode UE may also support carrier aggregation and/or multiple connectivity carrier aggregation as described herein. The UE 315 may be an example of one of the UEs of FIG. 1, FIG. 2, FIG. 4, FIG. 5, FIG. 6, FIG. 11. The eNodeB 305-a and/or secondary eNodeB 305-b may be an example of one of the eNodeBs, base stations, network entities, etc. of FIG. 1, FIG. 2, FIG. 4, FIG. 5, FIG. 6, FIG. 11. While only one UE 315, one eNodeB 305-a, and one secondary eNodeB 305-b are illustrated in FIG. 3, it will be appreciated that the system 300 can include any number of UEs 315, eNodeBs 305-a, and/or secondary eNodeBs 305-b. In one specific example, UE 315 can communicate with one eNodeB 305-a over one or more LTE component carriers 330-1 to 330-N while communicating with another eNodeB 305-b over another one or more LTE component carriers 330-M to 330-P.

The eNodeB 305-a can transmit information to the UE 315 over forward (downlink) channels 332-1 through 332-N on LTE component carriers $CC_1$ through $CC_N$ 330. In addition, the UE 315 can transmit information to the eNodeB 305-a over reverse (uplink) channels 334-1 through 334-N on LTE component carriers $CC_1$ through $CC_N$. Similarly, the eNodeB 305-b may transmit information to the UE 315 over forward (downlink) channels 332-m through 332-p on LTE component carriers $CC_M$ through $CC_P$ 330. In addition, the UE 315 may transmit information to the eNodeB 305-b over reverse (uplink) channels 334-m through 334-p on LTE component carriers $CC_M$ through $CC_P$ 330.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

Figure 4:
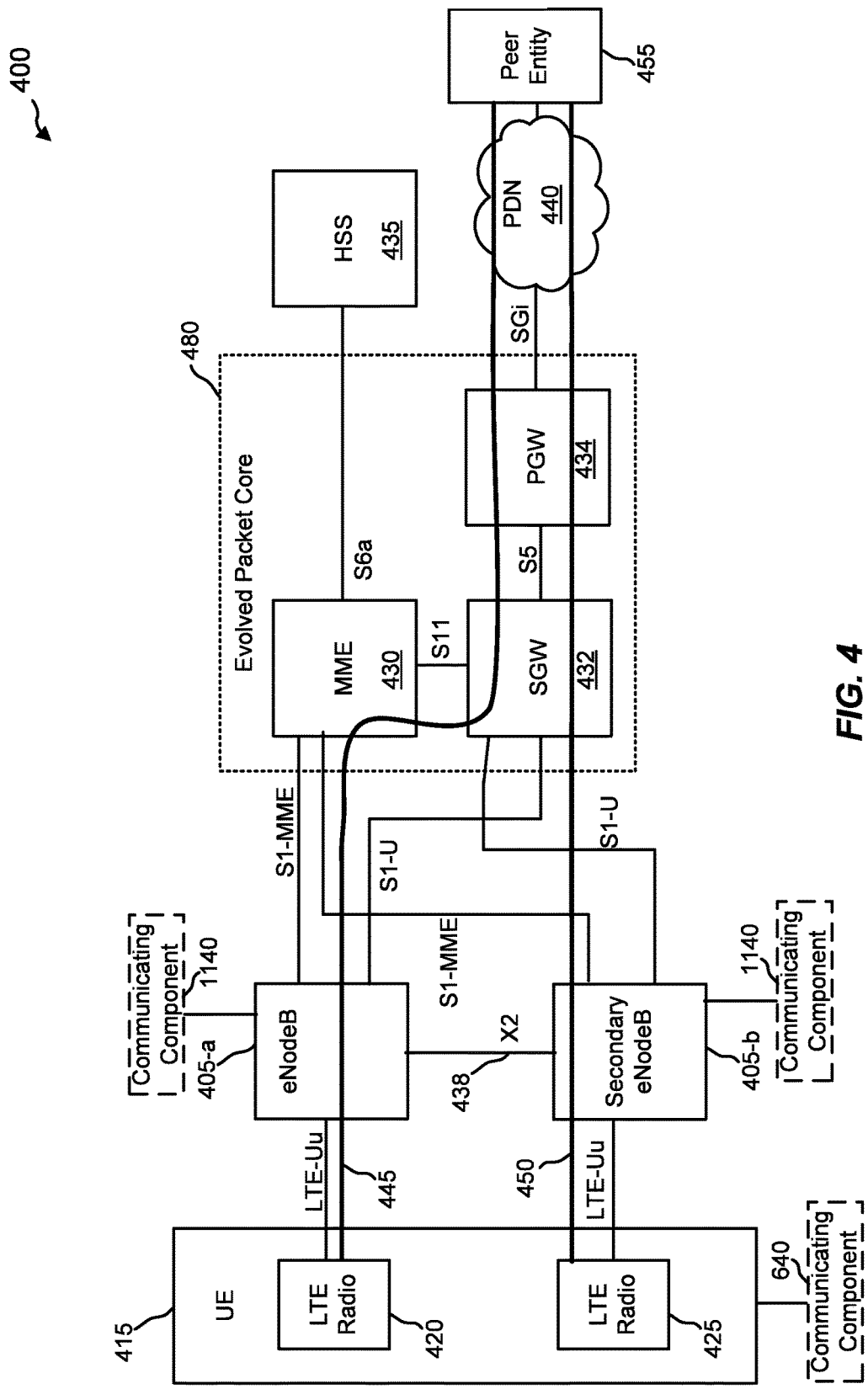
FIG. 4 is a block diagram conceptually illustrating an example of data paths between a UE and a PDN, in accordance with various aspects of the present disclosure.

In the present example, the UE 315 may receive data from one eNodeB 305-a. However, users on a cell edge may experience high inter-cell interference which may limit the data rates. Multiflow allows UEs to receive data from two eNodeBs 305-a and 305-b concurrently. In some aspects, the two eNodeBs 305-a may be non-collocated and may be configured to support multiple connectivity carrier aggregation. Multiflow works by sending and receiving data from the two eNodeBs 305-a/305-b in two totally separate streams when a UE is in range of two cell towers in two adjacent cells at the same time (see FIG. 5 below). The UE talks to two eNodeB 305-a and/or 305-b simultaneously when the device is on the edge of either eNodeBs' reach. By scheduling two independent data streams to the mobile device from two different eNodeBs at the same time, multiflow exploits uneven loading in the wireless communication networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated. FIG. 4 is a block diagram conceptually illustrating an example of data paths 445 and 450 between a UE 415 and a PDN 440 (e.g., Internet or one or more components to access the Internet) in accordance with an aspect of the present disclosure. The data paths 445, 450 are shown within the context of a wireless communications system 400 for aggregating data from different eNodeBs 405-a and 405-b, which may or may not use the same RAT. The system 200 of FIG. 2 may be an example of portions of the wireless communications system 400. The wireless communications system 400 may include a multi-mode UE 415, an eNodeB 405-a, secondary eNodeB 405-b that can be coupled to the eNodeB 405-a via a backhaul link 438 (e.g., based on a X2 interface), an evolved packet core (EPC) 480, a PDN 440, and a peer entity 455. UE 415 can include a communicating component 640 for determining whether to prioritize communications with multiple eNodeBs 405-a/405-b or related cells configured in multiple connectivity wireless communications. The eNodeB 405-a (and/or eNodeB 405-b) can include a communicating component 1140 for providing transmit power percentages or other parameters to one or more UEs 415 for concurrently communicating with eNodeB 405-a (and/or 405-b) and another eNodeB 405-a (and/or 405-b) or related cells. The multi-mode UE 415 may be configured to support carrier aggregation, multiple connectivity (e.g., dual connectivity) carrier aggregation, and/or the like. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and an LTE radio 425. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, FIG. 11, the eNodeB 405-a may be an example of the eNodeBs/base stations/network entities of FIG. 1, FIG. 2, FIG. 3, FIG. 5, FIG. 6, FIG. 11, the eNodeB 405-b may be an example of the secondary eNodeB/base stations/network entities of FIG. 1, FIG. 2, FIG. 3, FIG. 5, FIG. 6, FIG. 11, and/or the EPC 480 may be an example of the core network 130 of FIG. 1. The eNodeBs 405-a and 405-b in FIG. 4 may be not be collocated or otherwise may not be in high-speed communication with each other. In addition, in an example, eNodeBs 405 and 405-*b* may communicate with different EPCs 480.

Referring back to FIG. 4, the eNodeB 405-*a* and/or 405-*b* may be capable of providing the UE 415 with access to the PDN 440 using the aggregation of one or more LTE component carriers (e.g., with one or more eNodeBs). Accordingly, the UE 415 may involve carrier aggregation in dual connectivity, where one connection is to one network entity (eNodeB 405-*a*) and the other connection is to a different network entity (eNodeB 405-*b*). It is to be appreciated that UE 415 can communicate with additional eNodeBs 405-*a* and/or 405-*b* via additional data paths 445, 450 that traverse the EPC 408 or not to access PDN 440 to provide multiple connectivity wireless communications with multiple eNodeBs, carrier aggregation with multiple cells of an eNodeB, etc. Using this access to the PDN 440, the UE 415 may communicate with the peer entity 455. The eNodeB 405 and/or 405-*b* may provide access to the PDN 440 through the EPC 480 (e.g., through data path 445), and the eNodeB 405-*b* may provide direct access to the PDN 440 (e.g., through data path 450). In the depicted example, the UE 415 can communicate with eNodeB 405 as a MeNodeB and the eNodeB 405-*b* as SeNodeB over eNodeB-specific bearers. In an example, eNodeBs 405 and 405-*b* can communicate with one another over an X2 connection 438 to aggregate UE 415 communications for providing the EPC 480. In this example, UE 415 can access the PDN 440 by using the bearer with eNodeB 405 and/or secondary eNodeB 405-*b*, which can map communications over the data paths 445 and 450 to access the PDN 440.

The MME 430 may be the control node that processes the signaling between the UE 415 and the EPC 480. The MME 430 may provide bearer and connection management. The MME 430 may, therefore, be responsible for idle mode UE tracking and paging, bearer activation and deactivation, and SGW selection for the UE 415. The MME 430 may communicate with the eNodeBs 405-*a* and/or 405-*b* over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

All user IP packets transmitted over LTE may be transferred through eNodeBs 405-*a* and/or 405-*b* to the SGW 432, which may be connected to the PDN gateway 434 over an S5 signaling interface and the MME 430 over an S11 signaling interface. The SGW 432 may reside in the user plane and act as a mobility anchor for inter-eNodeB handovers and handovers between different access technologies. The PDN gateway 434 may provide UE IP address allocation as well as other functions.

The PDN gateway 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over data path 445 of the LTE link or data path 450. Signaling or control plane data related to the set of one or more EPS bearers may be transmitted between the LTE radio 420 of the UE 415 and the MME 430 of the EPC 480, by way of the eNodeBs 405-*a* and/or 405-*b*.

While aspects of FIG. 4 have been described with respect to LTE, similar aspects regarding aggregation and/or multiple connections may also be implemented with respect to UMTS or other similar system or network wireless communications radio technologies.

Figure 5:
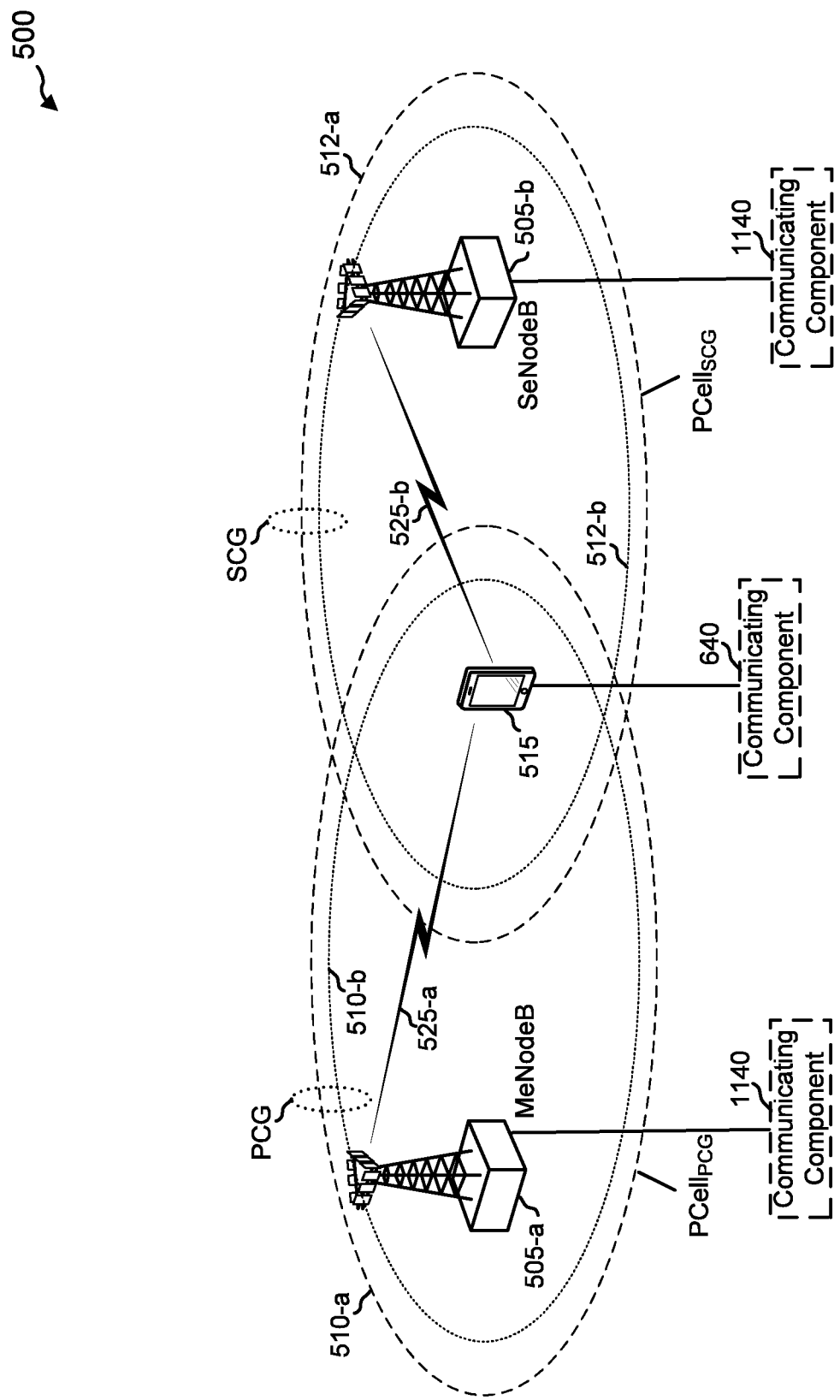
FIG. 5 is a diagram conceptually illustrating multiple connectivity carrier aggregation, in accordance with various aspects of the present disclosure.

FIG. 5 is a diagram conceptually illustrating multiple connectivity carrier aggregation, in accordance with an aspect of the present disclosure. A wireless communications system 500 may include a master eNodeB 505-*a* (MeNodeB or MeNB) having a set or group of cells referred to as a PCG that may be configured to serve the UE 515. The PCG may include one primary cell (PCell$_{PCG}$) 510-*a* and one or more secondary cells 510-*b* (only one is shown). The wireless communications system 500 may also include a secondary eNodeB 505-*b* (SeNodeB or SeNB) having a set or group of cells referred to as a secondary cell group or SCG that may be configured to serve the UE 515. The SCG may include one primary cell (PCell$_{SCG}$) 512-*a* and one or more secondary cells 512-*b* (only one is shown). Also shown is a UE 515 that supports carrier aggregation for multiple connectivity wireless communications (e.g., dual connectivity). The UE 515 may communicate with the MeNodeB 505-*a*, or a related PCell$_{PCG}$, via communication link 525-*a* and with the SeNodeB 505-*b*, or a related PCell$_{SCG}$, via communication link 525-*b*. UE 515 can include a communicating component 640 for determining whether to prioritize communications with multiple eNodeBs 505-*a*/505-*b* or related cells configured in multiple connectivity wireless communications. The eNodeB 505-*a* (and/or eNodeB 505-*b*) can include a communicating component 1140 for providing transmit power percentages or other parameters to one or more UEs 515 for concurrently communicating with eNodeB 505-*a* (and/or 505-*b*) and another eNodeB 505-*b* (and/or 505-*a*) or related cells.

In an example, the UE 515 may aggregate component carriers from the same eNodeB or may aggregate component carriers from collocated or non-collocated eNodeBs. In such an example, the various cells (e.g., different component carriers (CCs)) being used can be easily coordinated because they are either handled by the same eNodeB or by eNodeBs that can communicate control information. When the UE 515, as in the example of FIG. 5, performs carrier aggregation when in communication with two eNodeBs that are non-collocated, then the carrier aggregation operation may be different due to various network conditions. In this case, establishing a primary cell (PCell$_{SCG}$) in the secondary eNodeB 505-*b* may allow for appropriate configurations and controls to take place at the UE 515 even though the secondary eNodeB 505-*b* is non-collocated with the master eNodeB 505-*a*.

In the example of FIG. 5, the carrier aggregation may involve certain functionalities by the PCell$_{PCG}$ of the MeNodeB 505-*a*. For example, the PCell$_{PCG}$ may handle certain functionalities such as physical uplink control channel (PUCCH), contention-based random access control channel (RACH), and semi-persistent scheduling to name a few. Carrier aggregation with dual or multiple connectivity wireless communications to non-collocated eNodeBs may involve having to make some enhancements and/or modifications to the manner in which carrier aggregation is otherwise performed. Some of the enhancements and/or modifications may involve having the UE 515 connected to the MeNodeB 505-*a* and to the SeNodeB 505-*b* as described above. Other features may include, for example, having a timer adjustment group (TAG) comprise cells of one of the eNodeBs, having contention-based and contention-free random access (RA) allowed on the SeNodeB 505-*b*, separate discontinuous reception (DRX) procedures for the MeNodeB 505-*a* and to the SeNodeB 505-*b*, having the UE 515 send a buffer status report (BSR) to the eNodeB where the one or more bearers (e.g., eNodeB specific or split bearers) are served, as well as enabling one or more of power headroom report (PHR), power control, semi-persistent scheduling (SPS), and logical channel prioritization in connection with the $PCell_{SCG}$ in the secondary eNodeB 505-*b*. The enhancements and/or modifications described above, and well as others provided in the disclosure, are intended for purposes of illustration and not of limitation.

For carrier aggregation in dual connectivity, different functionalities may be divided between the MeNodeB 505-*a* and the SeNodeB 505-*b*. For example, different functionalities may be statically divided between the MeNodeB 505-*a* and the SeNodeB 505-*b* or dynamically divided between the MeNodeB 505-*a* and the SeNodeB 505-*b* based on one or more network parameters. In an example, the MeNodeB 505-*a* may perform upper layer (e.g., above the media access control (MAC) layer) functionality via a $PCell_{PCG}$, such as but not limited to functionality with respect to initial configuration, security, system information, and/or radio link failure (RLF). As described in the example of FIG. 5, the $PCell_{PCG}$ may be configured as one of the cells of the MeNodeB 505-*a* that belong to the PCG. The $PCell_{PCG}$ may be configured to provide lower layer functionalities (e.g., MAC/PHY layer) within the PCG.

In an example, the SeNodeB 505-*b* may provide configuration information of lower layer functionalities (e.g., MAC/PHY layers) for the SCG. The configuration information may be provided by the $PCell_{SCG}$ as one or more radio resource control (RRC) messages, for example. The $PCell_{SCG}$ may be configured to have the lowest cell index (e.g., identifier or ID) among the cells in the SCG. For example, some of the functionalities performed by the SeNodeB 505-*b* via the $PCell_{SCG}$ may include carrying the PUCCH, configuring the cells in the SCG to follow the DRX configuration of the $PCell_{SCG}$, configure resources for contention-based and contention-free random access on the SeNodeB 505-*b*, carrying downlink (DL) grants having transmit power control (TPC) commands for PUCCH, estimating pathloss based on $PCell_{SCG}$ for other cells in the SCG, providing common search space for the SCG, and providing SPS configuration information for the UE 515.

In some aspects, the $PCell_{PCG}$ may be configured to provide upper level functionalities to the UE 515 such as security, connection to a network, initial connection, and/or radio link failure, for example. The $PCell_{PCG}$ may be configured to carry physical uplink control channel (PUCCH) for cells in the PCG, to include the lowest cell index among the PCG, to enable the PCG cells to have the same discontinuous reception (DRX) configuration, to configure random access resources for one or both of contention-based and contention-free random access on the MeNodeB 505-*a*, to enable downlink grants to convey transmit power control (TPC) commands for PUCCH, to enable pathloss estimation for cells in the PCG, to configure common search space for the MeNodeB 505-*a*, and/or to configure semi-persistent scheduling.

In some aspects, the $PCell_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-*b*, to enable downlink grants to convey TPC commands for PUCCH, to enable pathloss estimation for cells in the SCG, to configure common search space for the SeNodeB 505-*b*, and/or to configure semi-persistent scheduling.

Returning to the example of FIG. 5, the UE 515 may support parallel PUCCH and physical uplink shared channel (PUSCH) configurations for the MeNodeB 505-*a* and the SeNodeB 505-*b*. In some cases, the UE 515 may use a configuration (e.g., UE 515 based) that may be applicable to both carrier groups. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/sounding reference signal (SRS) for the MeNodeB 505-*a* and the SeNodeB 505-*b*. In some cases, the UE 515 may use a configuration (e.g., UE based and/or PCG or SCG based) that may be applicable to both carrier groups. These configurations may be provided through RRC messages, for example.

Figure 6:
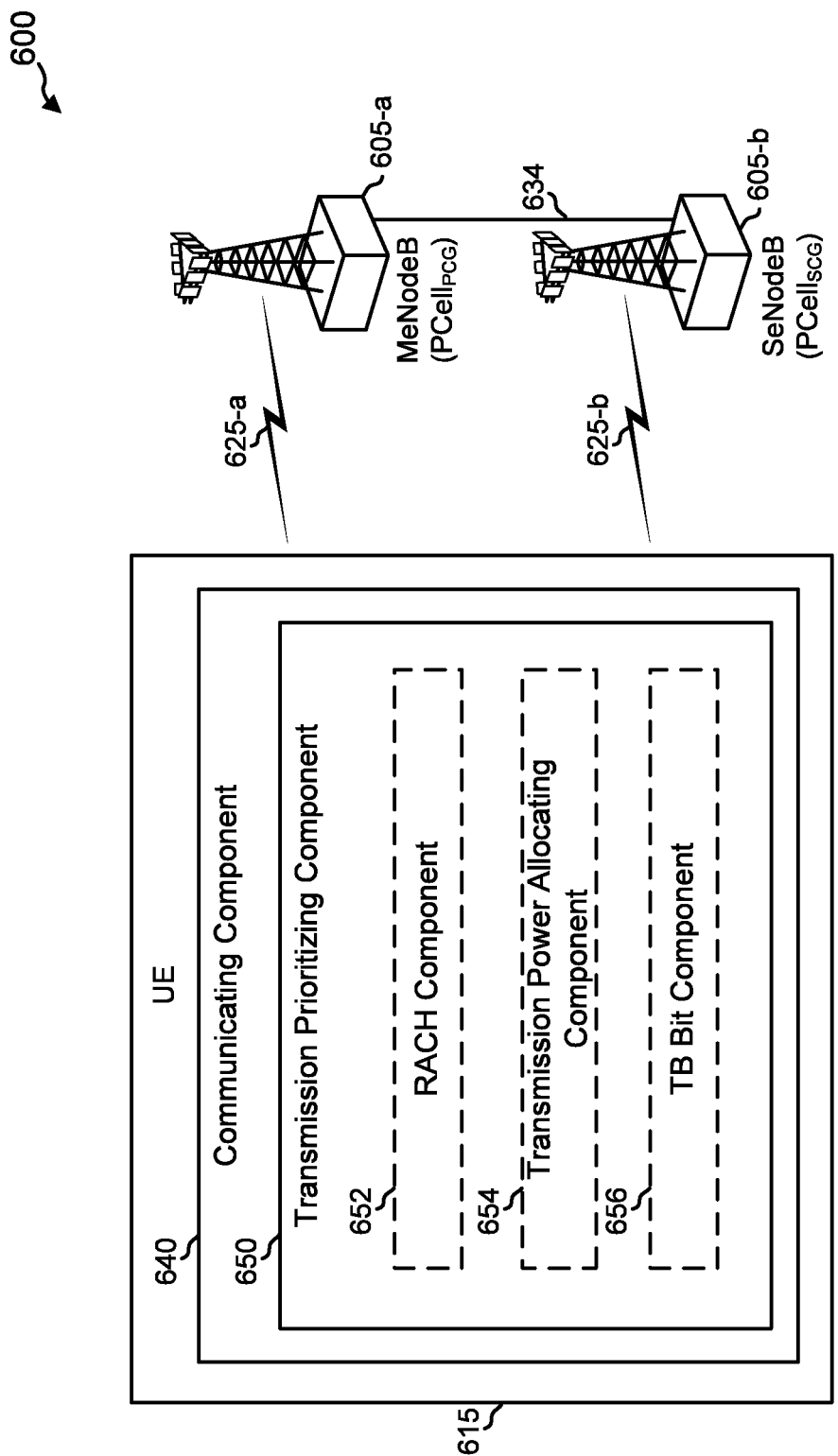
FIG. 6 is a block diagram conceptually illustrating an example of a UE and components configured in accordance with various aspects of the present disclosure.

FIG. 6 is a block diagram 600 conceptually illustrating an example of a UE 615 and components configured in accordance with an aspect of the present disclosure. FIGS. 7-10, which are described in conjunction with FIG. 6 herein, illustrate example methods 700, 800, 900, and 1000 in accordance with aspects of the present disclosure. Although the operations described below in FIGS. 7-10 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 6, a MeNodeB 605-*a* (providing a $PCell_{PCG}$), a SeNodeB 605-*b* (providing a $PCell_{SCG}$), and the UE 615 of diagram 600 may be one of the base stations/eNodeBs and UEs as described in various Figures. The MeNodeB 605-*a*, or a $PCell_{PCG}$ related thereto, and the UE 615 may communicate over a first communication link 625-*a*. As described, the PCG related to the MeNodeB 605-*a* may also include one or more other cells (not shown) provided by the MeNodeB 605-*a* or other eNodeBs with which UE 615 can communicate over the first communication link 625-*a*. The SeNodeB 605-*b*, or a $PCell_{SCG}$ related thereto, and the UE 615 may communicate over a second communication link 625-*b*. As described, the SCG related to the SeNodeB 605-*b* may also include one or more other cells (not shown) provided by the SeNodeB 605-*b* or other eNodeBs with which UE 615 can communicate over the second communication link 625-*b*. Moreover, the MeNodeB 605-*a* and SeNodeB 605-*b* (or related cells in the PCG and SCG) may communicate over a backhaul link 634. UE 615 may be configured to determine whether to prioritize certain transmissions to the MeNodeB 605-*a* and SeNodeB 605-*b* over first and second communication links 625-*a* and 625-*b* (e.g., for concurrent transmissions where the UE 615 is power limited).

In this regard, UE 615 may include a communicating component 640 for communicating over first and second communication links 625-*a* and 625-*b* with eNodeBs 605-*a* and 605-*b*. Communicating component 640 can include, or can be in communication with, a transmission prioritizing component 650 for determining whether to prioritize communications transmitted over first and second communication links 625-*a* and 625-*b* in similar time periods (e.g., concurrently) based on one or more parameters. In this regard, transmission prioritizing component 650 can optionally include, or be in communication with, a RACH component 652 for prioritizing transmissions in RACH procedures performed with multiple cells or cell groups, a transmission power allocating component 654 for allocating a percentage of transmission power to communications to multiple cells or cell groups, and/or a TB bit component 656 for determining whether to transmit or drop TBs for communicating to a plurality of cells or cell groups based on content thereof.

It is to be appreciated that communicating component 640, and/or components thereof, may include or may be implemented by one or more components of a device (e.g., a UE 602) to facilitate wired or wireless communication of data between devices. For example, communicating component 640 may include or may be implemented as hardware, a computer-readable medium executed by a processor, etc. on a device. In one specific example, communicating component 640 may include or may be implemented by at least one of a transmit processor 264 to transmit signals over antennas 252, a reception processor 258 to receive signals over antennas 252, a controller/processor 280 (or as block 281 within processor 280) to execute one or more functions described herein, etc.

Figure 7:
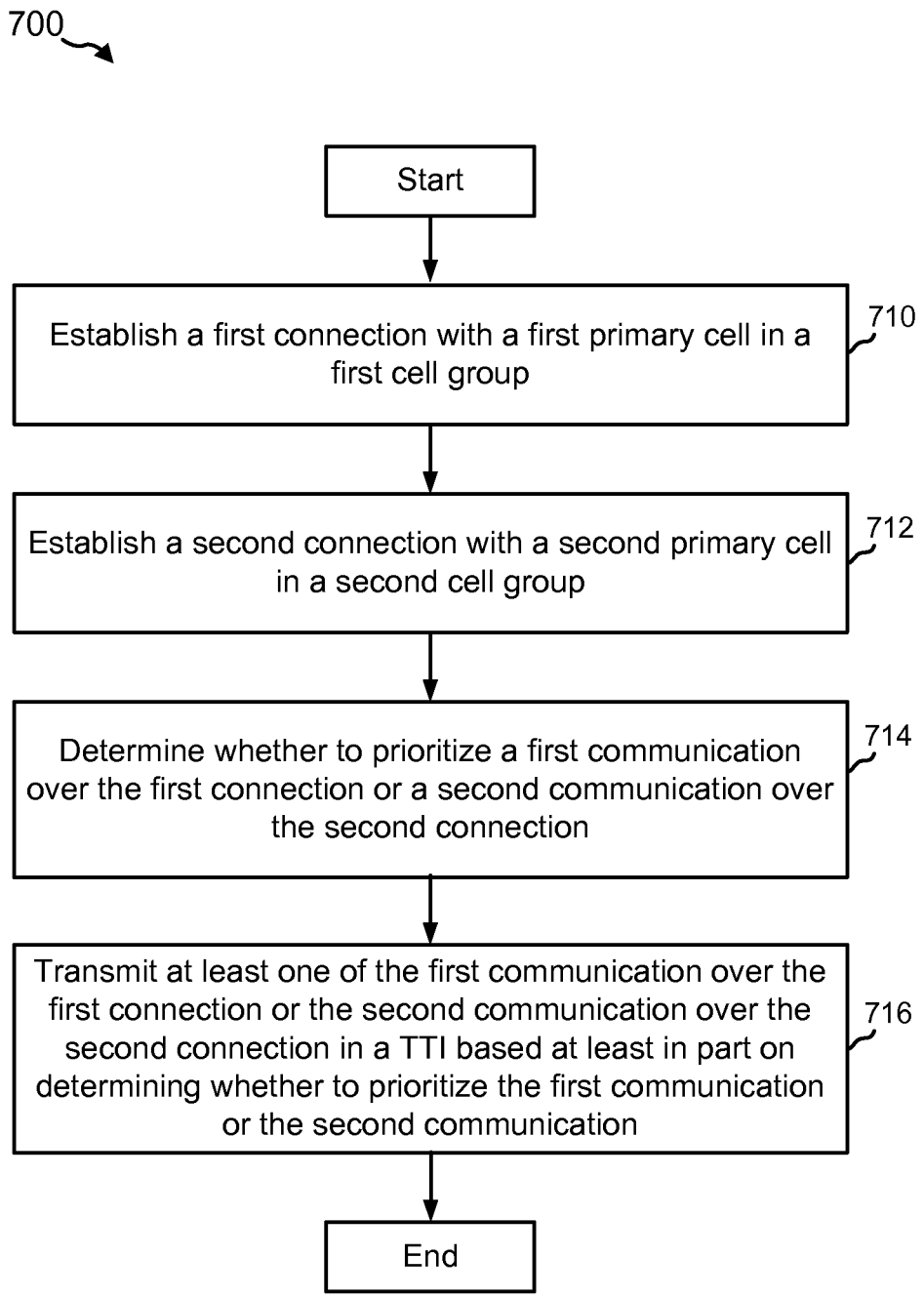
FIG. 7 is a flowchart illustrating a method for determining whether to prioritize communications, in accordance with various aspects of the present disclosure.

FIG. 7 illustrates an example method 700 for transmitting over one or more connections based at least in part on determining whether to prioritize the transmissions over the one or more connections. Method 700 includes, at Block 710, establishing a first connection with a first primary cell in a first cell group. Communicating component 640 (FIG. 6) can establish the first connection (e.g., communication link 625-*a* or one or more component carriers thereof) with the first primary cell (e.g., a PCell provided by MeNodeB 605-*a*) in the first cell group (e.g., the PCG). For example, communicating component 640 can establish the first connection at least in part by performing a random access procedure with the MeNodeB 605-*a* (e.g., over RACH resources provided by the MeNodeB 605-*a*). MeNodeB 605-*a* may additionally provision UE 615 with resources for communicating with other cells in the PCG (e.g., one or more SCells) using carrier aggregation. In addition, MeNodeB 605-*a* may also provision UE 615 with resources for communicating with another cell group (e.g., a SCG), and/or UE 615 may otherwise determine to also communicate with an SCG based on detecting the SCG, in multiple connectivity wireless communications.

In any case, method 700 can also include, at Block 712, establishing a second connection with a second primary cell in a second cell group. Communicating component 640 can establish the second connection (e.g., communication link 625-*b* or one or more component carriers thereof) with the second primary cell (e.g., a PCell provided by SeNodeB 605-*b*) in the second cell group (e.g., the SCG). For example, communicating component 640 can establish the second connection at least in part by performing a random access procedure with the SeNodeB 605-*b* (e.g., over RACH resources provided by the SeNodeB 605-*b*), based on information received from MeNodeB 605-*a*, and/or the like. SeNodeB 605-*b* may additionally provision UE 615 with resources for communicating with other cells in the SCG (e.g., one or more SCells) using carrier aggregation. Thus, UE 615 establishes connections with the MeNodeB 605-*a* and SeNodeB 605-*b* for communicating in respective PCG and SCG in multiple connectivity wireless communications.

The UE 615, however, may be power limited, and thus may not be capable of communicating concurrently over both the first and second connections (e.g., at least using a power specified for the first and second connections). Accordingly, method 700 may include, at Block 714, determining whether to prioritize a first communication over the first connection or a second communication over the second connection. For example, the first communication and second communication may be scheduled for concurrent transmission. As described further herein, transmission prioritizing component 650 can determine whether to prioritize the first communication over the first connection or the second communication over the second connection. For example, transmission prioritizing component 650 can determine whether to transmit the first communication instead of the second communication, whether to transmit the second communication instead of the first communication, whether to transmit the first communication at a higher power than the second communication (and/or a portion of power to utilize in transmitting the first communication or second communication), etc., as described further herein. In specific examples, transmission prioritizing component 650 can determine whether to transmit RACH communications over a first connection or over a second connection when scheduled concurrently, determine a portion of transmission power for transmitting concurrent communications over the first and second connections, determine whether to transmit certain TB bits related to concurrent communications over the first and second connections based on a content of the transport blocks, etc., as described in further detail below with respect to FIGS. 8-10.

Method 700 also includes, at Block 716, transmitting at least one of the first communication over the first connection or the second communication over the second connection in a transmission time interval (TTI) based at least in part on determining whether to prioritize the first communication or the second communication. Communicating component 640 can accordingly transmit at least one of the first communication over the first connection or the second communication over the second connection in the TTI based at least in part on determining whether to prioritize the first communication or the second communication.

Figure 8:
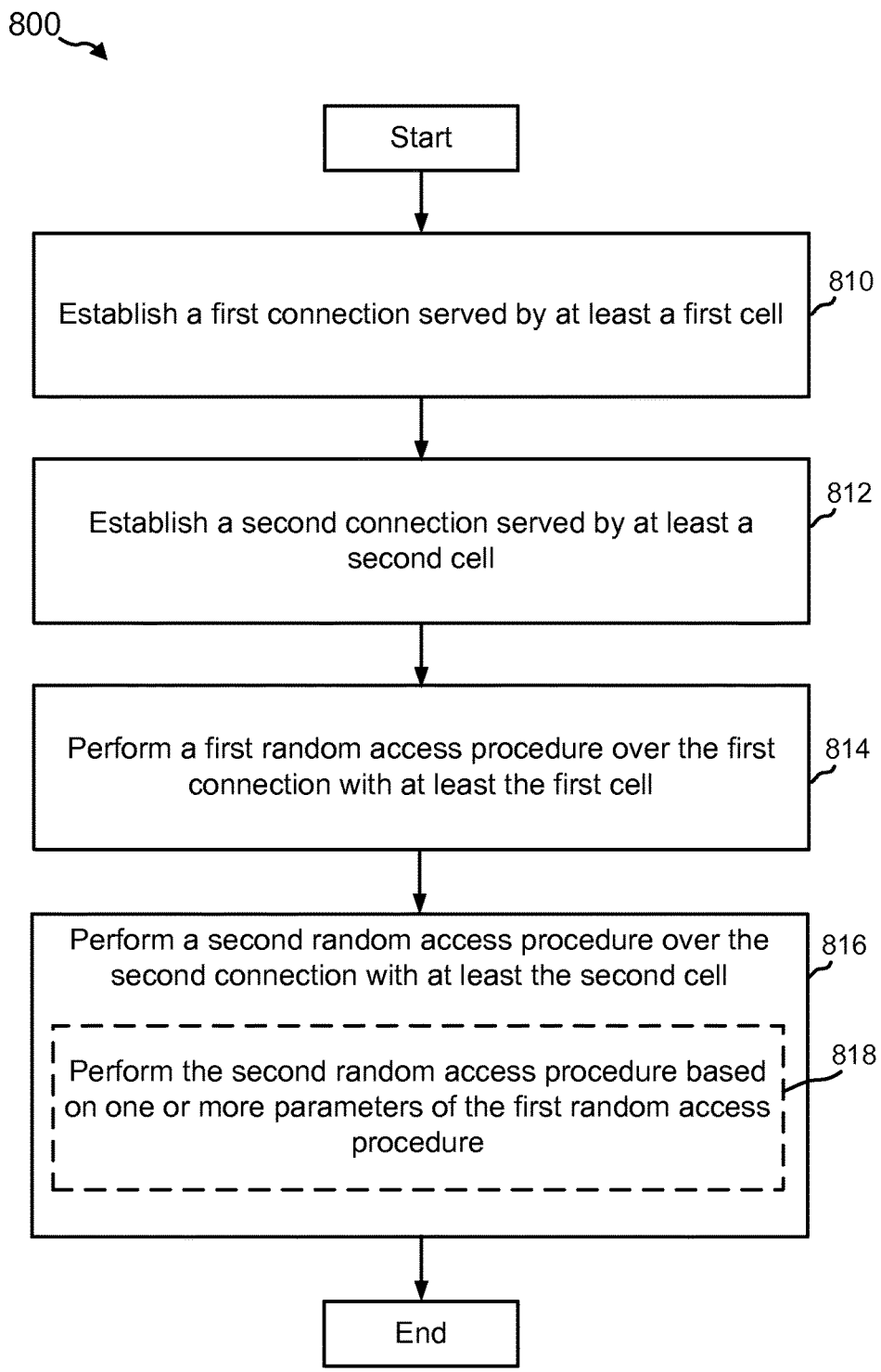
FIG. 8 is a flowchart illustrating a method for performing random access procedures, in accordance with various aspects of the present disclosure.

FIG. 8 illustrates an example method 800 for performing random access procedures with multiple cells. Method 800 includes, at Block 810, establishing a first connection served by at least a first cell. Communicating component 640 (FIG. 6) can establish the first connection served by at least the first cell, which can include establishing first communications link 625-*a* with MeNodeB 605-*a* or a related cell or cell group (e.g., PCG) thereof. Method 800 also includes, at Block 812, establishing a second connection served by at least a second cell. Communicating component 640 can also establish the second connection served by at least the second cell, which can include establishing second communications link 625-*b* with SeNodeB 605-*b* or a related cell or cell group (e.g., SCG) thereof. As described previously, the connections can be configured using multiple connectivity wireless communications to provide the UE 615 with communications configured in an PCG and SCG, where the communications may be concurrent.

Method 800 further includes, at Block 814, performing a first random access procedure over the first connection with at least the first cell. RACH component 652 can perform the first random access procedure over the first communication link 625-a. Method 800 further includes, at Block 816, performing a second random access procedure over the second connection with at least the second cell. RACH component 652 can perform the second random access procedure over the second communication link 625-b. RACH component 652 can perform the random access procedures concurrently, in one example, and can thus determine power allocation for the random access procedures in scenarios where the UE 615 is power limited. For example, RACH component 652 can perform the random access procedure with the SeNodeB 605-b over the second communication link 625-b based on one or more parameters of performing the random access procedure with the MeNodeB 605-a over the second communication link 625-a. Thus, performing the second random access procedure at Block 816 may optionally include, at Block 818, performing the second random access procedure based on one or more parameters of the first random access procedure.

In one example, the random access procedure may be a contention-based random access procedure performed by transmitting a series of access probes at increasing transmission power where the eNodeB responds with a random access response when the transmission power of the access probe is strong enough to be received by the eNodeB. In an example, RACH component 652 may periodically transmit random access probes to the PCG or SCG to avoid radio link failure (RLF). Where communicating component 640 has scheduled random access probes for the PCG and SCG to occur concurrently and the UE 615 is power limited, however, RACH component 652 may determine a transmission power for transmitting a random access probe to the PCG and/or another transmission power for concurrently transmitting a random access probe to the SCG (and/or whether to only transmit one or the other access probe).

In one example, RACH component 652 may determine a transmission power for transmitting the access probe to one of the cell groups based at least in part on a number of random access probes transmitted to the other cell group as part of the RACH procedure and/or a power of a next access probe to be transmitted to the other cell group such to avoid RLF. In a specific example, where access probes are concurrently scheduled for transmission to the PCG and SCG, RACH component 652 may use a greater transmission power for a random access probe to the SCG than originally allocated when in the power-limited scenario (and/or a less transmission power for a random access probe to transmit to the PCG to allow the increase in power for the access probe to the SCG) where higher transmission power access probes for the PCG have not resulted in receiving a response. Thus, as the likelihood of completing the access procedure with the PCG decreases, a higher transmission power is used for access probes in the parallel access procedure with the SCG to increase the likelihood of completing the access procedure with the SCG, while a lower power (or no power) can be used in transmitting a concurrently scheduled random access probe for the PCG. In this regard, the RACH component 652 can perform the second random access procedure based on one or more parameters of the first random access procedure.

In another example, RACH component 652 may determine to use a greater transmission power for a random access probe to the SCG when concurrently scheduled for transmission with a random access probe to the PCG where the random access probe to the SCG is the last (or n probes from the last) random access probe to be transmitted before RLF is declared with the SCG and/or where the random access probe to the PCG is the first (or m probes from the first) rand access probe to be transmitted before RLF is declared with the PCG. In this example, since RLF with the SCG is more imminent, the RACH component 652 can use greater transmission power for the random access probe to the SCG in an attempt to receive a random access response, whereas the RACH component 652 not receiving a response to the random access probe to the PCG may not be a concern as there are more higher power random access probes to be sent to the PCG before declaring RLF.

In either example, it is to be appreciated that similar concepts can be applied to transmission power of access probes with the PCG based on the access procedure with the SCG as well and/or other access procedures, etc. In addition, RACH component 652 can be configured with different timers for performing the first random access procedure with the PCG and the second random access procedure with the SCG (e.g., a first timer and a second timer, respectively) to lessen the likelihood of parallel random access procedures with multiple cells, and thus concurrent random access probes being scheduled in consecutive transmissions.

Figure 9:
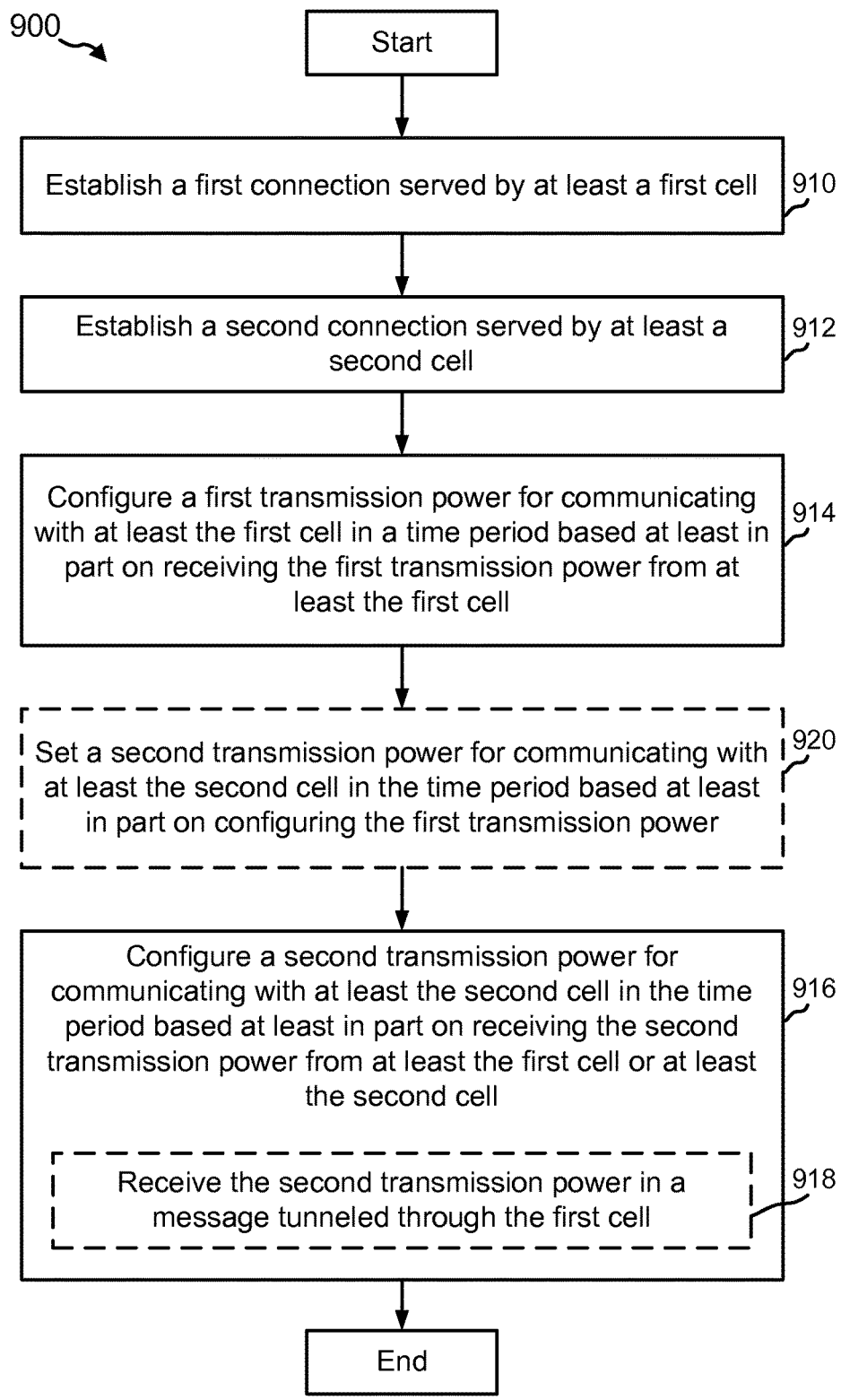
FIG. 9 is a flowchart illustrating a method for allocating transmission power, in accordance with various aspects of the present disclosure.

FIG. 9 illustrates an example method 900 for reporting timing difference between one or more cell groups to one or more eNodeBs. Method 900 includes, at Block 910, establishing a first connection served by at least a first cell. Communicating component 640 (FIG. 6) can establish the first connection served by at least the first cell, which can include first communication link 625-a with MeNodeB 605-a or a related cell or cell group (e.g., PCG) thereof. Method 900 also includes, at Block 912, establishing a second connection served by at least a second cell. Communicating component 640 can also establish the second connection served by at least the second cell, which can include second communication link 625-b with SeNodeB 605-b or a related cell or cell group (e.g., SCG) thereof. As described previously, the connections can be configured using multiple connectivity wireless communications to provide the UE 615 with communications configured in an PCG and SCG, where the communications may be concurrent.

Method 900 also includes, at Block 914, configuring a first transmission power for communicating with at least the first cell in a time period based at least in part on receiving the first transmission power from at least the first cell. Transmission power allocating component 654 can set the first transmission power for communicating with at least the first cell (e.g., one or more cells in a PCG provided by MeNodeB 605-a) in the time period (e.g., the TTI) based at least in part on receiving the first transmission power from at least the first cell (e.g., from one or more cells of the PCG via MeNodeB 605-a). For example, transmission power allocating component 654 can receive the first transmission power as a percentage of available transmission power from the PCG. The percentage may be indicated as a value that maps to a percentage with a certain granularity based on the indicated percentage. For example, transmission power between 10-90% may be indicated at 5% granularity, and transmission power between 0-10% and 90-100% may be indicated at 2% granularity (e.g., possible percentages of 0%, 2%, 4%, 6%, 8%, 10%, 15%, 20%, 25%, . . . , 80%, 85%, 90%, 92%, 94%, 96%, 98%, 100%) using related values mapped to the percentages. Thus, in the above example, with 27 possible values, transmission power allocating component 654 can indicate the transmission power with 5 bits, where the bits can indicate a value that maps to one of the 27 possible values. It is to be appreciated that this example is not limiting and substantially any configuration of granularities constrained to a certain number of bits can be used to express the transmission power. In addition, the mapping of values to percentages can be configured at the UE 615 (e.g., by the MeNodeB 605-*a* or another network node), stored in a memory of the UE 615, etc.

Method 900 also includes, at Block 916, configuring a second transmission power for communicating with at least the second cell in a time period based at least in part on receiving the second transmission power from at least the first cell or at least the second cell. Transmission power allocating component 654 can configure the second transmission power for communicating with at least the second cell (e.g., SCG) in the time period (e.g., the TTI) based at least in part on receiving the second transmission power from at least the first cell (e.g., PCG via MeNodeB 605-*a*) or at least the second cell (e.g., SCG via SeNodeB 605-*b*). In one example, SeNodeB 605-*b* can signal the second transmission power percentage to the UE 615, in which case transmission power allocating component 654 receives the second transmission power percentage from SeNodeB 605-*b* and accordingly sets the transmission power. As described further herein, MeNodeB 605-*a* and SeNodeB 605-*b* may coordinate transmission power percentages for the UE 615 over backhaul link 634. MeNodeB 605-*a* and SeNodeB 605-*b* may coordinate the transmission power percentages based on various considerations including channel quality with the UE 615 from each cell group, bearer requirements of the UE 615, etc.

In another example, MeNodeB 605-*a* can communicate the transmission power percentages to UE 615 for both the PCG and SCG (e.g., in the same or separate indication messages). In this example, as described further herein, MeNodeB 605-*a* can determine the transmission power percentages and can communicate the transmission power percentage of the SCG to SeNodeB 605-*b*. In one example, the SeNodeB 605-*b* may transmit the power percentage to the UE 615 over the second communication link 625-*b* or in a message tunneled to the UE 615 by communicating the message to MeNodeB 605-*a* via backhaul link 634 for transmitting over first communication link 625-*a*, as described further in reference to FIGS. 11 and 12. Accordingly, configuring the second transmission power at Block 916 of method 900 may also optionally include, at Block 918, receiving the second transmission power in a message tunneled through the first cell. Transmission power allocating component 654 can receive the second transmission power in the message (e.g., from the SeNodeB 605-*b* or related cell of the SCG) tunneled through the first cell (e.g., a cell of the PCG provided by MeNodeB 605-*a*).

Moreover, for example, tunneling the message indicating the transmission power percentage in this regard may introduce additional delay in providing the transmission power percentage to the UE 615. Accordingly, method 900 may optionally include, at Block 920, setting a second transmission power for communicating with at least the second cell in the time period based at least in part on configuring the first transmission power. Transmission power allocating component 654 can set the second transmission power for communicating with at least the second cell in the time period (e.g., the TTI) based at least in part on configuring the first transmission power. For example, transmission power allocating component 654 may use a currently configured transmission power percentage for communicating with the SCG until the new transmission power percentage is received based on the first transmission power being configured. If, however, the first transmission power percentage received for PCG plus the current transmission power percentage for SCG exceeds an available transmission power (e.g., 100% transmission power), transmission power allocating component 654 can set the transmission power percentage for SCG that is the available transmission power (e.g., 100%) minus the first transmission power percentage received for communicating with the PCG. In any case, transmission power allocating component 654 can receive the transmission power percentages over first communication link 625-*a* or second communication link 625-*b* for employing in communicating with the PCG and/or SCG.

Figure 10:
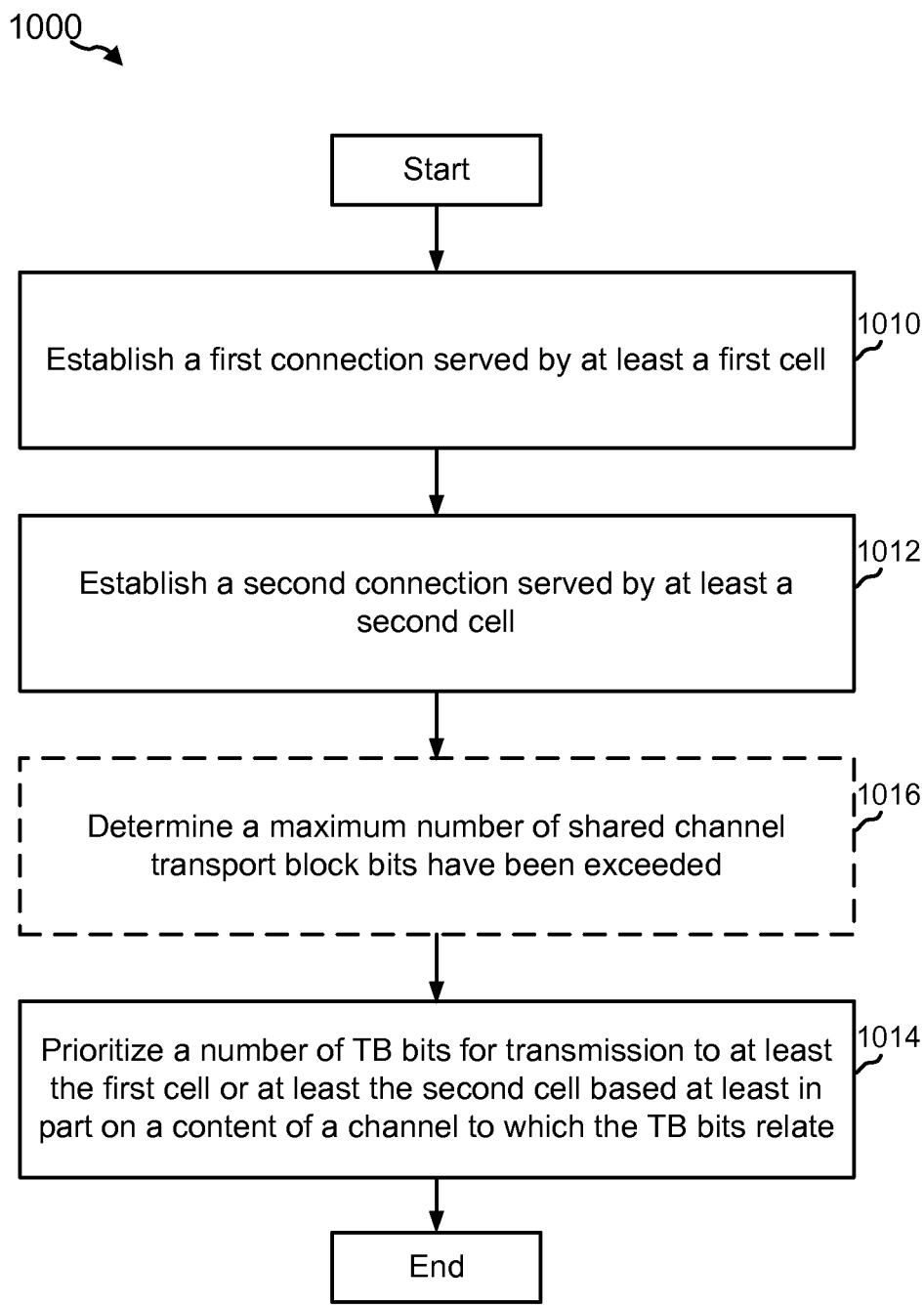
FIG. 10 is a flowchart illustrating a method for prioritizing transport block bits, in accordance with various aspects of the present disclosure.

FIG. 10 illustrates an example method 1000 for prioritizing TB bits for transmitting to one or more cells. Method 1000 includes, at Block 1010, establishing a first connection served by at least a first cell. Communicating component 640 (FIG. 6) can establish the first connection served by at least the first cell, which can include first communication link 625-*a* with MeNodeB 605-*a* or a related cell or cell group (e.g., PCG) thereof. Method 1000 also includes, at Block 1012, establishing a second connection served by at least a second cell. Communicating component 640 can also establish the second connection served by at least the second cell, which can include second communication link 625-*b* with SeNodeB 605-*b* or a related cell or cell group (e.g., SCG) thereof. As described previously, the connections can be configured using multiple connectivity wireless communications to provide the UE 615 with communications configured in an PCG and SCG, where the communications may be concurrent.

Method 1000 also includes, at Block 1014, prioritizing a number of TB bits for transmission to at least the first cell or at least the second cell based at least in part on a content of a channel to which the TB bits relate. TB bit component 656 can prioritize the number of TB bits for transmission to at least the first cell (e.g., a cell of the PCG provided by MeNodeB 605-*a*) or at least the second cell (e.g., a cell of the SCG provided by SeNodeB 605-*b*) based at least in part on a content of a channel to which the TB bits relate. In one example, TB bit component 656 can prioritize the number of TB bits based at least in part on determining that a maximum number of shared channel (e.g., uplink shared channel (UL-SCH) or similar channel) transport block bits have been exceeded within a TTI. Thus, in one example, method 1000 can optionally include, at Block 1016, determining the maximum number of shared channel transport block bits have been exceeded.

For example, in prioritizing the number of TB bits, TB bit component 656 can determine whether the TB bits relate to control data (e.g., uplink control information (UCI) or similar data), RRC layer communications, etc., and can prioritize such communications accordingly (e.g., and/or over control or data channel communications). For example, TB bit component 656 can transmit or drop certain TBs of an uplink control channel (e.g., PUSCH) based on the content determined for the TBs. For example, if the TB bits correspond to RRC signaling but a power limit of the UE 615 is exceeded by the transmission, TB bit component 656 may scale the power of the RRC signal (e.g., scale the power down) without dropping the signal to adhere to the power limitation when transmitting the RRC signal with other communications for another cell group.

Similarly, for example, TB bit component 656 can prioritize TB bits related to retransmission data over those related to new transmission data, TB bits related to dynamic scheduled data over those related to semi-static scheduled data, etc. such that communicating component 640 transmits the prioritized TB bits while other TB bits may be dropped or assigned a transmission power that is scaled down from an original transmission power to achieve a power limitation of the UE 615. It is to be appreciated that a power limitation of the UE 615 can include a power limitation configured by MeNodeB 605-*a*, SeNodeB 605-*b*, etc., a power limitation configured in the UE 615 (e.g., by a mobile network operator or device manufacturer), etc.

Figure 11:
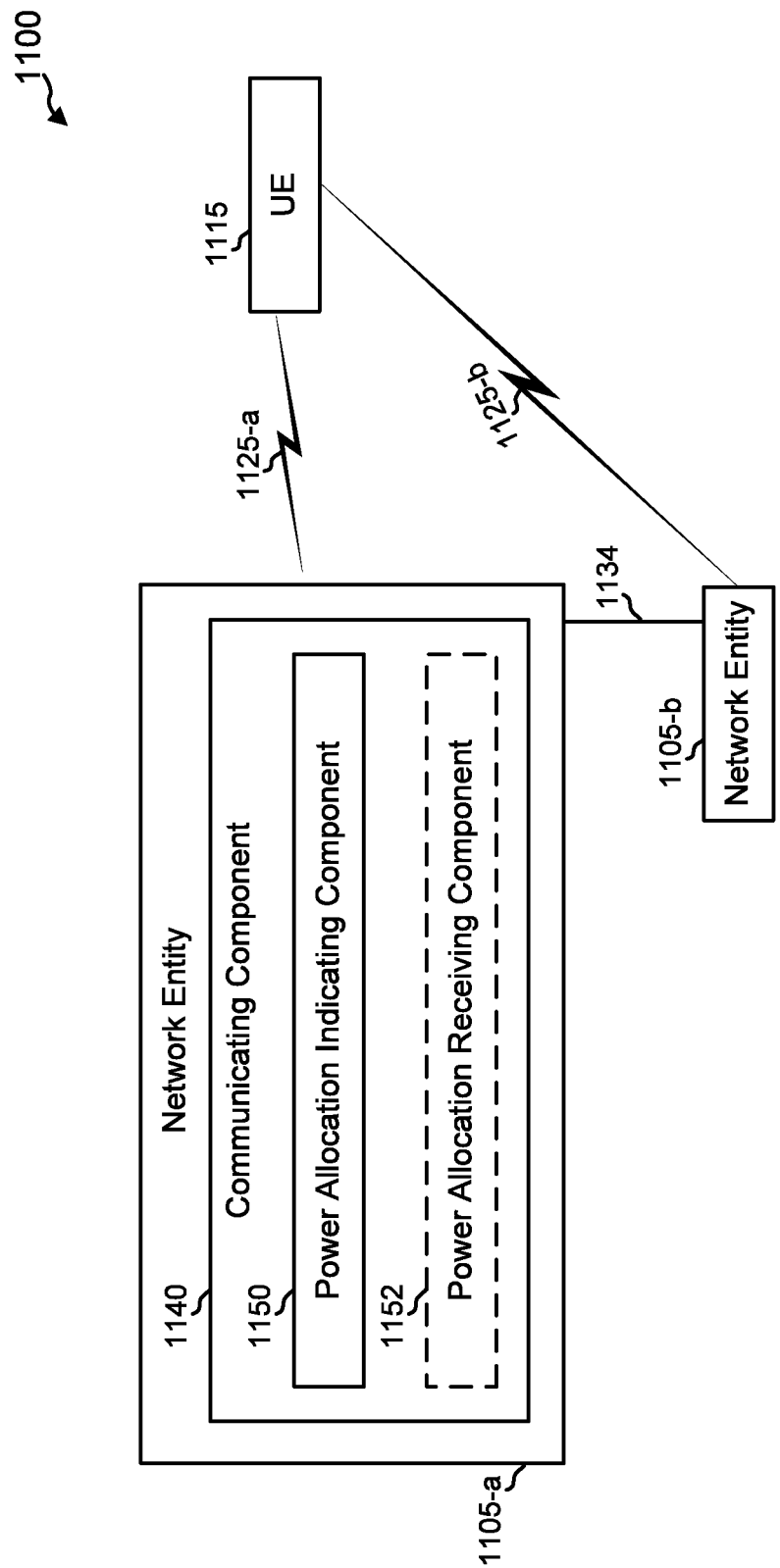
FIG. 11 is a block diagram conceptually illustrating an example of a network entity and components configured in accordance with various aspects of the present disclosure.
Figure 12:
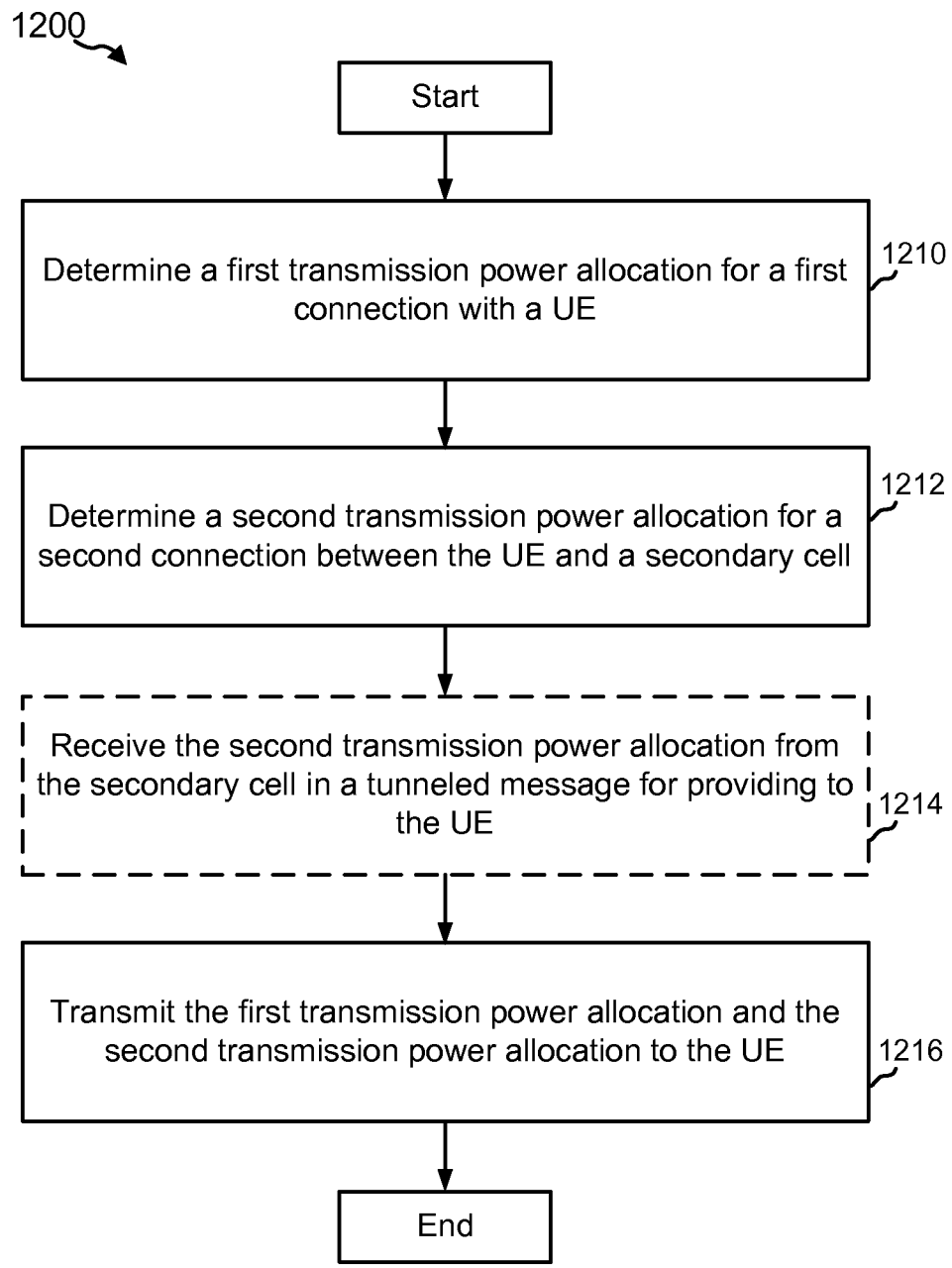
FIG. 12 is a flowchart illustrating a method for indicating transmission power allocations in accordance with various aspects of the present disclosure.

FIG. 11 is a block diagram 1100 conceptually illustrating an example of a network entity 1105 and components configured in accordance with an aspect of the present disclosure. FIG. 12, which is described in conjunction with FIG. 11 herein, illustrates an example method 1200 in accordance with aspects of the present disclosure. Although the operations described below in FIG. 12 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 11, diagram 1100 includes a network entities 1105-*a* and 1105-*b*, which can include one or more previously described base stations/eNodeBs (e.g., MeNodeB 605-*a* with a $PCell_{PCG}$, SeNodeB with a $PCell_{SCG}$, etc.), or other network entities, along with a UE 1115, which can include one or more previously described UEs (e.g., UE 615). The network entity 1105-*a* and the UE 1115 may communicate over first communication link 1125-*a*, and the network entity 1105-*b* and UE 1115 may communicate over second communication link 1125-*b*. UE 1115 may be configured to prioritize communications with network entities 1105-*a* and 1105-*b*, as described herein. Network entity 1105-*a* includes a communicating component 1140 for indicating transmission power allocation percentages to UE 1115, as described above.

Communicating component 1140 can include, or can be in communication with, a power allocation indicating component 1150 for indicating one or more transmission power allocations to UE 1115 for communicating with network entities 1105-*a* and 1105-*b*, and/or optionally a power allocation receiving component 1152 for receiving a tunneled message from network entity 1105-*b* including a transmission power allocation for communicating to UE 1115.

It is to be appreciated that communicating component 1140, and/or components thereof, may include or may be implemented by one or more components of a device (e.g., a network entity 1105-*a*) to facilitate wired or wireless communication of data between devices. For example, communicating component 1140 may include or may be implemented as hardware, a computer-readable medium executed by a processor, etc. on a device. In one specific example, communicating component 1140 may include or may be implemented by at least one of a transmit processor 220 to transmit signals over antennas 234, a reception processor 238 to receive signals over antennas 234, a controller/processor 240 to execute one or more functions described herein, etc.

FIG. 12 illustrates an example method 1200 for indicating transmission power allocations for communicating with multiple cells in multiple connectivity. Method 1200 includes, at Block 1210, determining a first transmission power allocation for a first connection with a UE. Power allocation indicating component 1150 (FIG. 11) can determine the first transmission power allocation for the first connection (e.g., first communication link 1125-*a*) with the UE 1115. Determining the first transmission power allocation may be based on one or more parameters, such as channel quality with the UE 1115 at the network entity 1105-*a* and/or network entity 1105-*b*, and may be determined in conjunction with the second transmission power allocation described below. In addition, for example, the first transmission power allocation can correlate to a value that maps to a transmission power percentage, as described above.

Method 1200 also includes, at Block 1212, determining a second transmission power allocation for a second connection between the UE and a secondary cell. Power allocation indicating component 1150 can determine the second transmission power allocation for the second connection (e.g., second communication link 1125-*b*) between UE 1115 and secondary cell (e.g., network entity 1105-*b* or a related cell or cell group). For example, power allocation indicating component 1150 may negotiate or otherwise determine the first and second power allocations as percentages of power where UE 1115 is power limited. In this regard, in an example, power allocation indicating component 1150 can also communicate the second transmission power allocation (e.g., or the first transmission power allocation from which the second transmission power allocation may be determined) to network entity 1105-*b* over backhaul link 1134.

Method 1200 may optionally include, at Block 1214, receiving the second transmission power allocation from the secondary cell in a tunneled message for providing the UE. In this example, power allocation receiving component 1152 can receive the message from network entity 1105-*b*, which can include the second transmission power allocation previously provided to the network entity 1105-*b* by power allocation indicating component 1150 over the backhaul link 1134.

Method 1200 also includes, at Block 1216, transmitting the first transmission power allocation and the second transmission power allocation to the UE. Communicating component 1140 can transmit the first transmission power allocation and the second transmission power allocation to the UE 1115 for utilizing in communicating over first and second communication links 1125-*a* and 1125-*b*. For example, transmitting the second transmission power allocation can include providing the tunneled message received from network entity 1105-*b* to the UE 1115 or otherwise. In addition, in this regard, communicating component 1140 can transmit the first transmission power allocation and the second transmission power allocation in the same or separate indication messages. Moreover, in one example, communicating component 1140 may transmit the first transmission power allocation and the other network entity 1105-*b* can transmit the second transmission power allocation, as described above.

Figure 13:
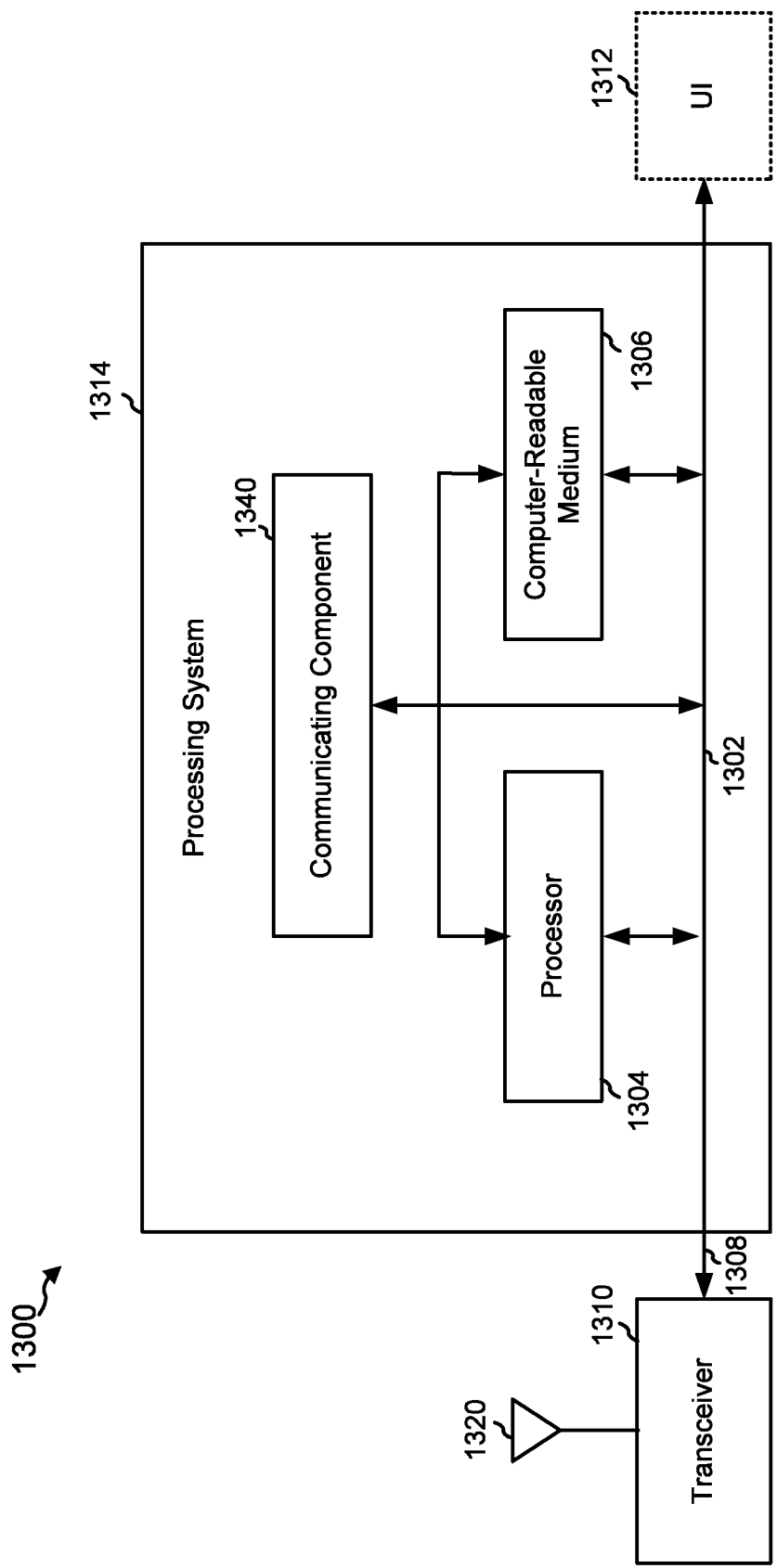
FIG. 13 is a block diagram conceptually illustrating an example hardware implementation for an apparatus employing a processing system configured in accordance with various aspects of the present disclosure.

FIG. 13 is a block diagram conceptually illustrating an example hardware implementation for an apparatus 1300 employing a processing system 1314 configured in accordance with an aspect of the present disclosure. The processing system 1314 includes a communicating component 1340. In one example, the apparatus 1300 may be the same or similar, or may be included with one of the UEs described in various Figures. In such example, the communicating component 1340 may correspond to, for example, the communicating component 640 of UE 615, communicating component 1140 of network entity 1105, etc. In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links together various circuits including one or more processors (e.g., central processing units (CPUs), microcontrollers, application specific integrated circuits (ASICs), field programmable gate arrays (FPGAs)) represented generally by the processor 1304, and computer-readable media, represented generally by the computer-readable medium 1306. The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310, which is connected to one or more antennas 1320 for receiving or transmitting signals. The transceiver 1310 and the one or more antennas 1320 provide a mechanism for communicating with various other apparatus over a transmission medium (e.g., over-the-air). Depending upon the nature of the apparatus, a user interface (UI) 1312 (e.g., keypad, display, speaker, microphone, joystick) may also be provided.

The processor 1304 is responsible for managing the bus 1302 and general processing, including the execution of software stored on the computer-readable medium 1306. The software, when executed by the processor 1304, causes the processing system 1314 to perform the various functions described herein for any particular apparatus. The computer-readable medium 1306 may also be used for storing data that is manipulated by the processor 1304 when executing software. The communicating component 1340 as described above may be implemented in whole or in part by processor 1304, or by computer-readable medium 1306, or by any combination of processor 1304 and computer-readable medium 1306.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for allocating transmission power in multiple connectivity wireless networks, comprising:

establishing, at a user equipment (UE), a first connection with a first primary cell in a first cell group;

establishing, at the UE, a second connection with a second primary cell in a second cell group;

configuring, at the UE, a first transmission power for communicating with the first cell group in a transmission time interval (TTI) based at least in part on receiving, at the UE, a first transmission power from the first primary cell, wherein the first transmission power includes a value that maps to one of a plurality or percentages of available transmission power at the UE;

configuring, at the UE, a second transmission power for communicating with the second cell group in the TTI based at least in part on receiving the first transmission power or receiving a second transmission power; and transmitting, at the UE and in the TTI, the first communication over the first connection based on the first transmission power, and the second communication over the second connection based on the second transmission power.

2. The method of claim 1, wherein the first communication relates to a first random access procedure performed over the first connection with the first primary cell, and wherein the second communication relates to a second random access procedure performed over the second connection with the second primary cell.

3. The method of claim 2, further comprising prioritizing the second random access procedure over the first random access procedure based at least in part on a number of random access attempts in the first random access procedure.

4. The method of claim 2, further comprising prioritizing the second random access procedure over the first random access procedure based at least in part on a power to use for a next random access transmission in the second random access procedure.

5. The method of claim 2, wherein the first random access procedure is based on a first timer, and the second random access procedure is based on a second timer, wherein the first timer and the second timer utilize different timer values.

6. The method of claim 2, wherein transmitting first communication and the second communication comprises transmitting the second access probe with a higher transmission power than the first access probe in the TTI.

7. The method of claim 1, wherein receiving the second transmission power comprises receiving the second transmission power from the second primary cell in a message tunneled through the first primary cell.

8. The method of claim 1, further comprising using a different transmission power for communicating with the second cell group in the TTI until the second transmission power is received, wherein the different transmission power is a previous transmission power used for communicating with the second cell group.

9. The method of claim 1, further comprising using a different transmission power for communicating with the second cell group in the TTI until the second transmission power is received, wherein the different transmission power is set based at least in part on the first transmission power where the first transmission power plus a current transmission power used in communicating with the second cell group exceeds an available transmission power.

10. The method of claim 1, wherein at least a portion of the plurality of percentages are of different granularity.

11. The method of claim 1, further comprising determining to prioritize a number of transport block bits for transmission over the first connection or the second connection based at least in part on a content of a channel to which the transport block bits relate.

12. The method of claim 11, wherein determining to prioritize the number of transport block bits comprises prioritizing transport block bits related to retransmissions over those related to new transmissions.

13. The method of claim 11, wherein determining to prioritize the number of transport block bits comprises scaling a transmission power of transport block bits on an uplink control channel that correspond to radio resource control (RRC) communications.

14. An apparatus for allocating transmission power in multiple connectivity wireless networks, comprising:

at least one processor configured to execute:

a communicating component configured to establish, at the apparatus, a first connection with a first primary cell in a first cell group, and establish, at the apparatus, a second connection with a second primary cell in a second cell group; and a transmission power allocating component configured to:

configure, at the apparatus, a first transmission power for communicating with the first cell group in a transmission time interval (TTI) based at least in part on receiving, at the apparatus, a first transmission power from the first primary cell, wherein the first transmission power includes a value that maps to one of a plurality of percentages of available transmission power at the apparatus; and configure, at the apparatus, a second transmission power for communicating with the second cell group in the TTI based at least in part on receiving the first transmission power or receiving a second transmission power, wherein the communicating component is further configured to transmit, at the apparatus and in the TTI, the first communication over the first connection based on the first transmission power and the second communication over the second connection based on the second transmission power; and a memory coupled to the at least one processor.

15. The apparatus of claim 14, wherein the first communication relates to a first random access procedure performed over the first connection with the first primary cell, and wherein the second communication relates to a second random access procedure performed over the second connection with the second primary cell.

16. The apparatus of claim 15, wherein the at least one processor is further configured to execute a random access channel (RACH) component configured to prioritize the second random access procedure over the first random access procedure based at least in part on a number of random access attempts in the first random access procedure.

17. The apparatus of claim 15, wherein the at least one processor is further configured to execute a random access channel (RACH) component configured to prioritize the second random access procedure over the first random access procedure based at least in part on a power to use for a next random access transmission in the second random access procedure.

18. The apparatus of claim 15, wherein the communicating component is configured to transmit the second access probe with a higher transmission power than the first access probe in the TTI.

19. The apparatus of claim 14, wherein the transmission power allocating component is configured to receive the second transmission power from the second primary cell in a message tunneled through the first primary cell.

20. The apparatus of claim 14, wherein the transmission power allocating component is configured to use a different transmission power for communicating with the second cell group in the TTI until the second transmission power is received, wherein the different transmission power is a previous transmission power used for communicating with the second cell group.

21. The apparatus of claim 14, wherein the transmission power allocating component is configured to use a different transmission power for communicating with the second cell group in the TTI until the second transmission power is received, wherein the different transmission power is set based at least in part on the first transmission power where the first transmission power plus a current transmission power used in communicating with the second cell group exceeds an available transmission power.

22. The apparatus of claim 14, wherein the at least one processor is further configured to execute a transmission prioritizing component configured to determine to prioritize a number of transport block bits for transmission over the first connection or the second connection based at least in part on a content of a channel to which the transport block bits relate.

23. The apparatus of claim 14, wherein at least a portion of the plurality of percentages are of different granularity.

24. An apparatus for allocating transmission power in multiple connectivity wireless networks, comprising:
    means for establishing, at the apparatus, a first connection with a first primary cell in a first cell group, and establishing, at the apparatus, a second connection with a second primary cell in a second cell group;
    means for configuring, at the apparatus, a first transmission power for communicating with the first cell group in a transmission time interval (TTI) based at least in part on receiving, at the apparatus, a first transmission power from the first primary cell, wherein the first transmission power includes a value that maps to one of a plurality or percentages of available transmission power at the apparatus;
    means for configuring, at the apparatus, a second transmission power for communicating with the second cell group in the TTI based at least in part on receiving the first transmission power or receiving a second transmission power;
    and
    means for transmitting, at the apparatus and in the TTI, the first communication over the first connection based on the first transmission power and the second communication over the second connection based on the second transmission power.

25. The apparatus of claim 24, wherein the first communication relates to a first random access procedure performed over the first connection with the first primary cell, and wherein the second communication relates to a second random access procedure performed over the second connection with the second primary cell.

26. The apparatus of claim 24, wherein at least a portion of the plurality of percentages are of different granularity.

27. A non-transitory computer-readable storage medium comprising computer-executable code for allocating transmission power in multiple connectivity wireless networks, the code comprising:
    code for establishing, at a user equipment (UE), a first connection with a first primary cell in a first cell group, and establishing, at the UE, a second connection with a second primary cell in a second cell group;
    code for configuring, at the UE, a first transmission power for communicating with the first cell group in a transmission time interval (TTI) based at least in part on receiving, at the UE, a first transmission power from the first primary cell, wherein the first transmission power includes a value that maps to one of a plurality or percentages of available transmission power at the UE;
    code for configuring, at the UE, a second transmission power for communicating with the second cell group in the TTI based at least in part on receiving the first transmission power or receiving a second transmission power;
    and
    code for transmitting, at the UE and in the TTI, the first communication over the first connection based on the first transmission power and the second communication over the second connection based on the second transmission power.

28. The non-transitory computer-readable storage medium of claim 27, wherein the first communication relates to a first random access procedure performed over the first connection with the first primary cell, and wherein the second communication relates to a second random access procedure performed over the second connection with the second primary cell.

29. The non-transitory computer-readable storage medium of claim 27, wherein at least a portion of the plurality of percentages are of different granularity.

* * * * *